(12) United States Patent
Ando et al.

(10) Patent No.: US 7,912,353 B2
(45) Date of Patent: *Mar. 22, 2011

(54) INFORMATION STORAGE MEDIUM AND INFORMATION RECORDING/PLAYBACK SYSTEM

(75) Inventors: Hideo Ando, Hino (JP); You Yoshioka, Yokohama (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/856,627

(22) Filed: Aug. 14, 2010

(65) Prior Publication Data

US 2011/0002631 A1    Jan. 6, 2011

Related U.S. Application Data

(60) Division of application No. 12/622,116, filed on Nov. 19, 2009, which is a division of application No. 11/501,892, filed on Aug. 10, 2006, now Pat. No. 7,636,513, which is a division of application No. 10/801,701, filed on Mar. 17, 2004, now Pat. No. 7,200,326, which is a division of application No. 10/669,525, filed on Sep. 25, 2003, now Pat. No. 7,536,081, which is a division of application No. 09/939,582, filed on Aug. 28, 2001, now Pat. No. 6,654,543, which is a division of application No. 09/643,985, filed on Aug. 23, 2000, now Pat. No. 6,549,721, which is a continuation of application No. PCT/JP99/00795, filed on Feb. 23, 1999.

(30) Foreign Application Priority Data

Feb. 23, 1998 (JP) .................................. 10-040876
Feb. 23, 1998 (JP) .................................. 10-040877
Feb. 23, 1998 (JP) .................................. 10-040879

(51) Int. Cl.
*H04N 5/92* (2006.01)
*H04N 5/80* (2006.01)
*H04N 5/89* (2006.01)
*H04N 5/917* (2006.01)

(52) U.S. Cl. ......... 386/326; 386/240; 386/241; 386/329
(58) Field of Classification Search ........................ None
See application file for complete search history.

(56) References Cited

U.S. PATENT DOCUMENTS

| | | |
|---|---|---|
| 5,870,523 A | 2/1999 | Kikuchi et al. |
| 5,907,658 A | 5/1999 | Murase et al. |
| 5,913,010 A | 6/1999 | Kaneshige et al. |
| 5,915,067 A | 6/1999 | Nonomura et al. |
| 6,078,727 A | 6/2000 | Saeki et al. |
| 6,137,954 A | 10/2000 | Sawabe et al. |
| 6,167,189 A | 12/2000 | Taira et al. |
| 6,181,870 B1 | 1/2001 | Okada et al. |
| 6,212,330 B1 | 4/2001 | Yamamoto et al. |
| 6,215,952 B1 | 4/2001 | Yoshio et al. |

*Primary Examiner* — Thai Tran
*Assistant Examiner* — Daniel Tekle
(74) *Attorney, Agent, or Firm* — Oblon, Spivak, McClelland, Maier & Neustadt, L.L.P.

(57) ABSTRACT

There are provided an information storage medium capable of real-time recording/playback of digital moving picture information, and a digital information recording/playback system using this medium. In a medium that records/plays back data including video data and control information, the control information (DA21 in FIG. 4; RTR_VMG in FIG. 30) includes information (VOBU entry in FIG. 31) for accessing a specific portion (VOBU) of the video data.

4 Claims, 25 Drawing Sheets

| NUMBER OF PICTURES IN VOBU#1 | NUMBER OF PICTURES IN VOBU#2 | --- | NUMBER OF PICTURES IN VOBU#n | NUMBER OF ECC BLOCKS IN VOBU#1 | --- | NUMBER OF ECC BLOCKS IN VOBU#n |

| CELL ID | TOTAL TIME DURATION | NUMBER OF CELL DATA SETS | CELL DATA SET DESCRIPTOR | CELL TIME PHYSICAL SIZE | NUMBER OF CONSTITUENT VOBUS | TIME CODE TABLE | NUMBER OF ACQUIRED DEFECTS | ACQUIRED DEFECT ADDRESS |

<REMARKS> SET IS ALSO REFERRED TO AS EXTENT

| CELL DATA GENERAL INFORMATION | TIME CODE TABLE | ACQUIRED DEFECT INFORMATION | CELL VIDEO INFORMATION | CELL AUDIO INFORMATION | CELL SUB-PICTURE INFORMATION |

CELL TIME INFORMATION CTI#m

| CELL TIME GENERAL INFORMATION #m | CELL VOBU TABLE #m |

| VOBU INFORMATION #1 | VOBU INFORMATION #2 | -------- | VOBU INFORMATION #n |

| VOBU GENERAL INFORMATION | DUMMY PACK INFORMATION | AUDIO SYNCHRONIZATION INFORMATION |

FIG. 8

| CORRESPONDING INFORMATION | INFORMATION NAME | INFORMATION CONTENTS | NUMBER OF BYTES USED |
|---|---|---|---|
| VOBU GENERAL INFORMATION | I-PICTURE END POSITION | DIFFERENTIAL ADDRESS VALUE OF I-PICTURE END POSITION FROM VOBU START POSITION | 1 |
| DUMMY PACK INFORMATION | NUMBER OF DUMMY PACKS | NUMBER OF DUMMY PACKS IN VOBU | 1 |
| | DUMMY PACKS DISTRIBUTION | DUMMY PACK INSERTION DIFFERENTIAL ADDRESS FROM START OF VOBU, AND EACH NUMBER OF DUMMY PACKS (2 BYTES EACH) | 2 x DUMMY PACK NUMBER |
| AUDIO SYNCHRONIZATION INFORMATION | AUDIO STREAM CHANNEL NUMBER | NUMBER OF CHANNELS OF AUDIO STREAM | 1 |
| | I-PICTURE AUDIO POSITION #1 | DIFFERENTIAL ADDRESS VALUE OF SECTOR INCLUDING AUDIO PACK OF THE SAME TIME AS I-PICTURE START TIME FROM START OF VOBU (MSB = "0" : LOCATED BEFORE VOBU, MSB = "1" : LOCATED AFTER VOBU) | 1 |
| | I-PICTURE START AUDIO SAMPLE NUMBER #1 | INDICATE SAMPLE NUMBER OF AUDIO SAMPLE POSITION OF THE SAME TIME AS I-PICTURE START TIME IN SECTOR AS COEFFICIENT OF SERIAL NUMBERS OF ALL AUDIO PACKS | 2 |
| | AUDIO SYNCHRONIZATION INFORMATION FLAG #1 | PRESENCE/ABSENCE OF SYNCHRONIZATION INFORMATION BETWEEN AUDIO AND VIDEO STREAMS (NEXT ITEM IS NOT AVAILABLE IF ABSENT) | 1 |
| | AUDIO SYNCHRONIZATION DATA | THE NUMBER OF AUDIO SAMPLES INCLUDED IN VOBU | 2 |

| | | |
|---|---|---|
| I-PICTURE AUDIO POSITION #2 | SAME CONTENTS AS #1 | 1 |
| I-PICTURE START AUDIO SAMPLE NUMBER #2 | | 2 |
| AUDIO SYNCHRONIZATION FLAG #2 | | 1 |
| AUDIO SYNCHRONIZATION DATA | | 2 |

FIG. 9

PGC INFORMATION

| PGC#1 | | PGC#2 | | PGC#3 | |
|---|---|---|---|---|---|
| NUMBER OF CELLS = 3 | | NUMBER OF CELLS = 3 | | NUMBER OF CELLS = 5 | |
| CELL#1 | CELL A | CELL#1 | CELL D | CELL#1 | CELL E |
| CELL#2 | CELL B | CELL#2 | CELL E | CELL#2 | CELL A |
| CELL#3 | CELL C | CELL#3 | CELL F | CELL#3 | CELL D |
| — | — | — | — | CELL#4 | CELL B |
| — | — | — | — | CELL#5 | CELL E |

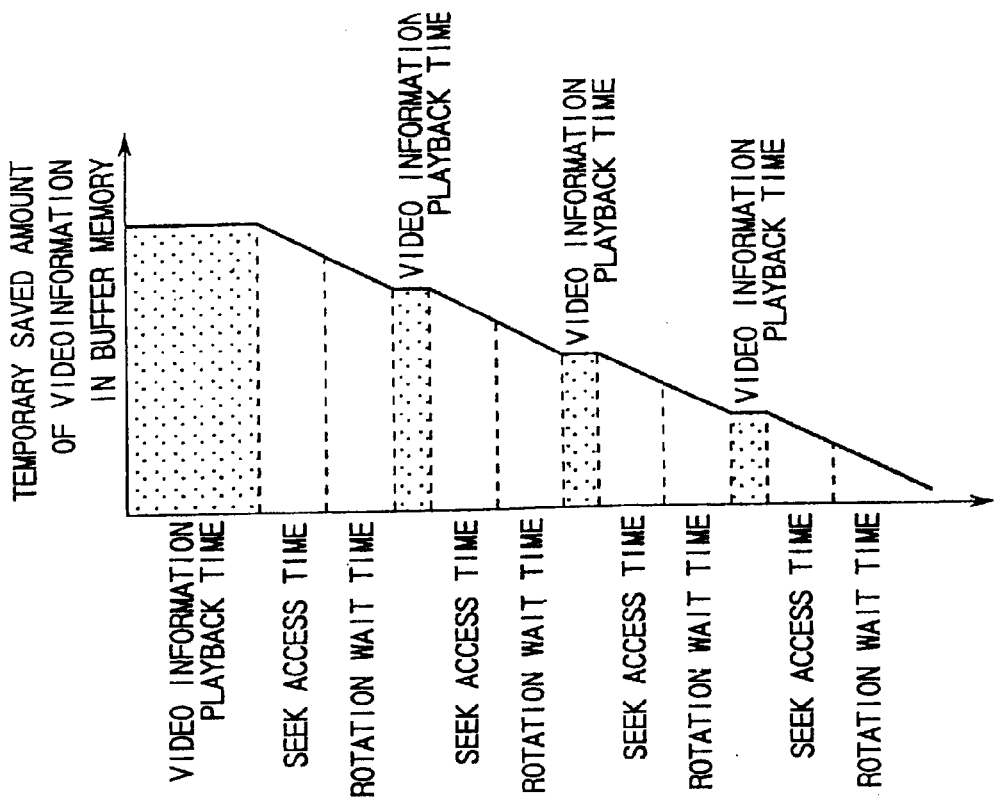
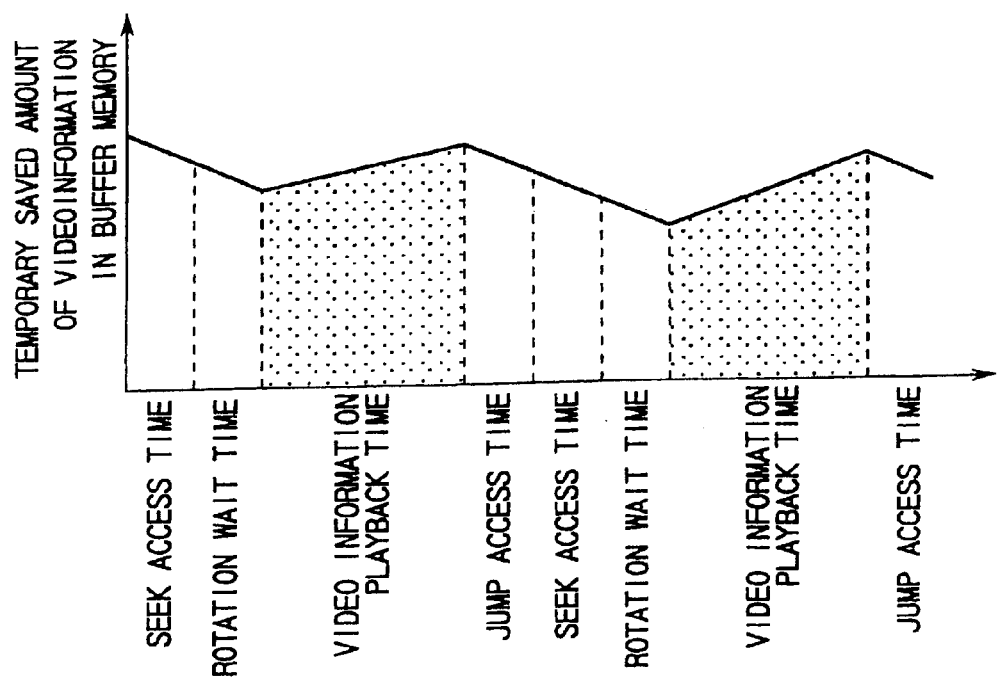

| FREE AREA 107 | CELL #1 | | | CELL #2 | | | | CELL #3 | | |
|---|---|---|---|---|---|---|---|---|---|---|
| | VOBU 108a | VOBU 108b | VOBU 108c | VOBU 108d | VOBU 108e | VOBU 108f | VOBU 108g | VOBU 108h | VOBU 108i | VOBU 108j |

FIG. 22

| FREE AREA 107 | CELL #1 | | | CELL #2A | CELL #2B | | | CELL #3 | | |
|---|---|---|---|---|---|---|---|---|---|---|
| | VOBU 108a | VOBU 108b | VOBU 108c | VOBU 108d | VOBU 108e | VOBU 108f | VOBU 108g | VOBU 108h | VOBU 108i | VOBU 108j |

FIG. 23

| CELL #2A | | CELL #1 | | | | CELL #2B | | | CELL #3 | | |
|---|---|---|---|---|---|---|---|---|---|---|---|
| VOBU 108d* | VOBU 108p | VOBU 108a | VOBU 108b | VOBU 108c* | | VOBU 108q | VOBU 108f | VOBU 108g | VOBU 108h | VOBU 108i | VOBU 108j |

FREE AREA 106

FIG. 24

TIME MAP GENERAL INFORMATION TMAP_GI

| RELATIVE BYTE POSITION | FIELD NAME | CONTENTS | NUMBER OF BYTES |
|---|---|---|---|
| 0-1 | TM_ENT_Ns | NUMBER OF TIME ENTRIES | 2 |
| 2-3 | VOBU_ENT_Ns | NUMBER OF VOBU ENTRIES | 2 |
| 4-5 | TM_OFS | TIME OFFSET | 2 |
| 6-9 | ADR_OFS | ADDRESS OFFSET | 4 |

FIG. 32

TIME ENTRY TM_ENT

| RELATIVE BYTE POSITION | FIELD NAME | CONTENTS | NUMBER OF BYTES |
|---|---|---|---|
| 0-1 | VOBU_ENTN | VOBU ENTRY NUMBER | 2 |
| 2 | TM_DIFF | TIME DIFFERENCE | 1 |
| 3-6 | VOBU_ADR | TARGET VOBU ADDRESS | 4 |

FIG. 33

INFORMATION STORAGE MEDIUM AND INFORMATION RECORDING/PLAYBACK SYSTEM

CROSS-REFERENCE TO RELATED APPLICATIONS

This divisional application claims the benefit of priority under 35 U.S.C. §120 to U.S. application Ser. No. 12/622,116 filed on Nov. 19, 2009, which is a divisional of application Ser. No. 11/501,892 (now U.S. Pat. No. 7,636,513), filed on Aug. 10, 2006, which is a divisional of U.S. application Ser. No. 10/801,701 (now U.S. Pat. No. 7,200,326), filed on Mar. 17, 2004, which is a divisional of U.S. application Ser. No. 10/669,525 (now U.S. Pat. No. 7,536,081), filed on Sep. 25, 2003, which is a divisional of U.S. application Ser. No. 09/939,582 (now U.S. Pat. No. 6,654,543), filed on Aug. 28, 2001, which is a divisional of U.S. application Ser. No. 09/643,985 (now U.S. Pat. No. 6,549,721), filed on Aug. 23, 2000, the contents of each of which are incorporated herein by reference. U.S. application Ser. No. 09/643,985 is a continuation of Application No. PCT/JP99/00795 (not published in English), filed on Feb. 23, 1999. This application is based upon and claims the benefit of priority from the prior Japanese Patent Applications No. 10-040876, filed Feb. 23, 1998; No. 10-040877, filed Feb. 23, 1998; and No. 10-040879, filed Feb. 23, 1998, the entire contents of which are incorporated herein by reference.

BACKGROUND OF THE INVENTION

The present invention relates to an information storage medium represented by a large-capacity optical disc and a digital information recording/playback system using the medium.

In particular, the present invention relates to a DVD (digital versatile disc) recording/playback system that considers real-time recording of a moving picture.

The present invention also relates to a recording/playback system which can guarantee continuous playback (or continuous recording) upon continuously playing back (or continuously recording) information using playback devices (disc drives) having various access performances.

Furthermore, the present invention relates to a recording/playback system which can prevent any playback timing errors of video information and audio information recorded on the medium.

DESCRIPTION OF PRIOR ART

In recent years, systems for playing back the contents of optical discs that have recorded video (moving picture) data, audio data, and the like have been developed, and have prevailed for the purpose of playing back movie software, karaoke, and so on like LDs (laser discs), video CDs (video compact discs), and the like.

Among such systems, a DVD (Digital Versatile Disc) standard that uses MPEG2 (Moving Picture Experts Group) international standard, and adopts an audio compression scheme such as AC-3 (digital audio compression) or the like has been proposed. The DVD standard includes read-only DVD video (or DVD-ROM), write-once DVD-R, and erasable/rewritable DVD-RW (or DVD-RAM).

The DVD video (DVD-ROM) standard supports MPEG2 as a movie compression scheme, and AC3 audio and MPEG audio in addition to linear PCM as an audio recording scheme, in accordance with MPEG2 system layer. Furthermore, this DVD video standard is configured by appending sub-picture data for superimposed dialogs obtained by run-length-compressing bitmap data, and control data (navigation data) for playback control such as fastforwarding, rewinding, data search, and the like.

Also, this standard supports ISO9660 and UDF Bridge format to allow a computer to read data. Hence, a personal computer environment can handle video information of DVD video.

(Problem)

However, a personal computer system and DVD recording/playback system use different appropriate information processing methods, and it is difficult for the personal computer to record/play back movie information for a long period of time continuously (without being interrupted).

More specifically, in the personal computer environment, when file data is to be changed, a process for re-recording the entire changed file data on a free area of an information storage medium (HDD or the like) is done. At this time, the re-recording position on the information storage medium is determined irrespective of the file data recording position before change. The file data recording position before change is released as a small free area after the change. If such change of file data is frequently repeated, small free areas are scattered in a vermicular pattern at physically separated positions on the medium. As a result, upon recording new file data, that data is recorded on a plurality of vermiculated free areas while being fragmented. This state is called fragmentation.

In the information process of the personal computer, information (file data) used is readily scattered (fragmented) on the disc. Even when a file to be read out has been fragmented, required information can read out from a disc by sequentially playing back such fragments recorded randomly. This fragmentation slightly prolongs the required read-out time of a file, but the user does not feel disrupted if a high-speed HDD is used.

However, when recorded information (MPEG-compressed moving picture data) has been fragmented in a DVD recording/playback system, if such fragments recorded randomly are to be played back in turn, moving picture playback may often be interrupted. Especially, since an optical disc drive requires a longer seek time of an optical head than a high-speed disc drive such as an HDD or the like, the playback video is readily interrupted during seeking fragmented information in the DVD recording/playback system that records/plays back an MPEG moving picture video on/from an optical disc (DVD-RAM disc or the like), resulting in poor practicality of the current system.

When both personal computer data and DVD moving picture data are recorded, fragmentation is more likely to occur. Therefore, the DVD recording/playback system that includes the personal computer environment has no feasibility unless a very high-speed optical disc drive is developed, and a large-size buffer can be mounted at practical cost.

On the medium that records video information (cells), upon repeating editing and partial deletion of recorded information, individual pieces of video information lie scattered or straggle on the medium. When such scattered or straggling video information group is to be continuously played back according to a specific order, frequent accesses are required. During these accesses, since a recorded information group (a series of cells) cannot be played back from the medium, playback is interrupted.

That is, when a specific playback device (disc drive) plays back a scattered or straggling video information group while making frequent accesses, if the access frequency has exceeded a specific number of times, it becomes impossible (for that drive) to continuously output recorded information, thus disturbing seamless playback (without any interrupt).

Furthermore, the frequency shift of the reference clocks of a normal digital audio recorder is approximately 0.1%. When sound source information digitally recorded by a digital video tape (DAT) recorder is overdubbed on video information already recorded on a DVD-RAM disc by digital copy, the reference clocks between the video information and audio information may have an error of around 0.1%. Such reference clock error becomes so large that it cannot be ignored upon repeating the digital copy (or nonlinear edit using a personal computer or the like), and appears as interrupted playback tones or a phase shift between playback channels.

In some cases, audio information corresponding to a specific video pack is stored in an audio pack at a location largely separated from that video pack. When a specific cell is re-recorded at another location on an information storage medium, synchronization between video and audio packs fails if packs under specific cells are simply moved. When playback is made after recording, playback tones are interrupted at that portion.

(Objects)

It is the first object of the present invention to provide an information storage medium capable of real-time recording/real-time playback of digital moving picture information, and a digital information recording/playback apparatus using this medium.

It is the second object of the present invention to provide an information storage medium capable of seamless, continuous playback free from any interrupt by managing the access frequency to a scattered or straggling recorded information group in correspondence with the access performance of the playback device (disc drive) used, and a digital information recording/playback apparatus using this medium.

It is the third object of the present invention to provide an information storage medium which has special synchronization information so that video information and audio information can be synchronously played back (or inter-channel phase synchronization of multi-channel audio information can be taken) even when the reference clocks of the audio information have any error, and a digital information recording/playback apparatus using this medium.

It is the fourth object of the present invention to provide a digital information recording/playback system which can prevent playback information from being lost (sound interrupt or the like) upon playing back specific information, the recording position of which has been changed, when the recording position of the specific information (specific cell) in, e.g., video information, has been changed by, e.g., an edit process of information recorded on an information storage medium.

BRIEF SUMMARY OF THE INVENTION

In order to achieve the first object, in an information storage medium according to the present invention, which records and plays back data including video data and control information, the control information (DA21 in FIG. 4; RTR_VMG in FIG. 30) includes information (VOBU entry) that accesses a specific portion (VOBU) of the video data (DA22).

In order to achieve the first object, in an information recording system according to the present invention, which uses an information storage medium that can record data including video data and control information, information (VOBU entry) for accessing a specific portion (VOBU) of the video data (DA22) is described in the control information (DA21 in FIG. 4; RTR_VMG in FIG. 30) recorded on the information storage medium.

In order to achieve the second object, in an information storage medium according to the present invention, which records a plurality of pieces of video information at discrete positions, the plurality of pieces of video information are recorded to decrease an access frequency to the video information to be not more than a predetermined number of times upon sequentially playing back the plurality of pieces of video information.

In order to achieve the second object, in an information playback system according to the present invention, which plays back recorded information from an information storage medium which records a plurality of pieces of video information at discrete positions, when an access frequency to the video information exceeds a predetermined number of times upon sequentially playing back the plurality of pieces of video information, recording locations of the plurality of pieces of video information are changed to decrease the access frequency to be not more than the predetermined number of times.

In order to achieve the third object, in an information storage medium according to the present invention, which records audio/video data including video information, audio information, and control information, the control information describes audio synchronization information (VOBU information/audio synchronization information) for taking synchronization between the video information and the audio information.

In order to achieve the third object, an information recording/playback system according to the present invention, which records/plays back audio/video data which includes video information, audio information, and control information on/from a predetermined information storage medium, describes audio synchronization information (VOBU information/audio synchronization information) in the control information, and synchronizes the video information and audio information on the basis of the audio synchronization information upon playback.

In order to achieve the fourth object, in an information recording/playback system according to the present invention, which records and plays back audio/video data including video information, audio information, and control information on and from a predetermined information storage medium, audio synchronization information (VOBU information/audio synchronization information) is described in the control information, and when specific information in the video information is re-recorded at a different position on the information storage medium, audio information that synchronizes the video information is re-recorded at a different position on the information storage medium in accordance with the audio synchronization information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 is a view that exemplifies the internal structure of cell time information CTI shown in FIG. 4.

FIG. 9 is a view that exemplifies the contents of VOBU information shown in FIG. 8.

FIG. 17 is a graph for explaining another example (highest access frequency) of the relationship between the access operations and the like and the temporary storage amount in a buffer memory upon continuously playing back a video signal.

FIG. 18 is a graph for explaining still another example (the playback time balances with the access time) of the relationship between the access operations and the like and the temporary storage amount in a buffer memory upon continuously playing back a video signal.

FIG. 22 is a view that exemplifies cells which form a part of recorded AV data (video signal information) and a sequence of video object units VOBU in each cell.

FIG. 23 is a case wherein cell #2 is edited and data falls short in the middle of cell #2 (at the position of VOBU 108e) (VOBU 108e is re-encoded) in the sequence shown in FIG. 22.

FIG. 24 is a view for explaining changes of the cell configuration, VOBU sequence, and the position of a free area shown in FIG. 22 upon completion of editing in FIG. 23.

FIG. 32 is a view that exemplifies the contents of time map general information TMAP_GI shown in FIG. 31.

FIG. 33 is a view that exemplifies the contents of time entry TM_ENT# shown in FIG. 31.

DETAILED DESCRIPTION OF THE INVENTION

A digital information recording/playback system according to an embodiment of the present invention will be described hereinafter with reference to the accompanying drawings.

As a typical embodiment of a digital information recording/playback system according to the present invention, an apparatus which records/plays back moving picture data encoded based on MPEG2, e.g., a DVD digital video recorder, is known. (A practical example of this DVD digital video recorder will be explained later.)

Figure 1:
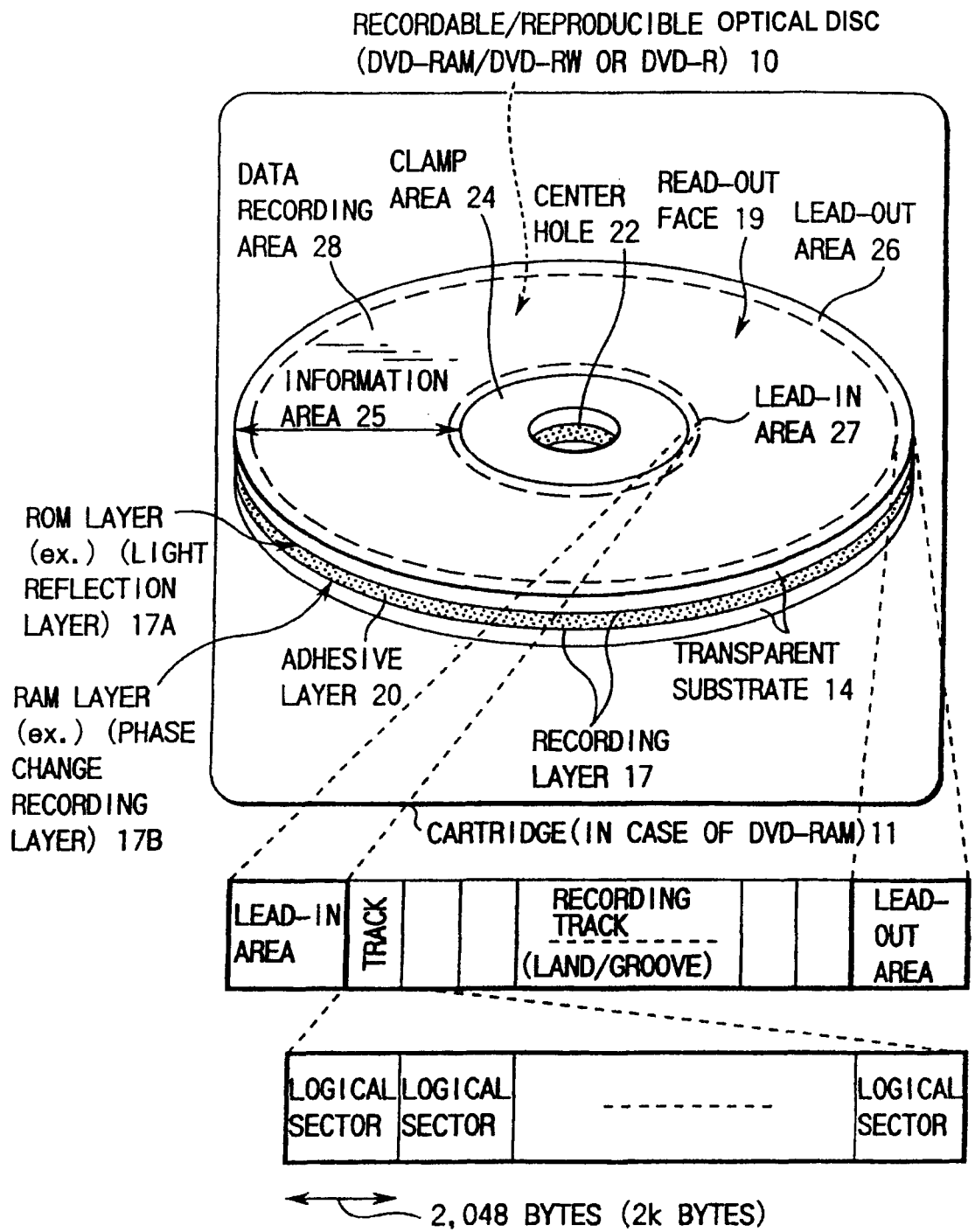
FIG. 1 is a view for explaining the structure of a recordable/reproducible optical disc (DVD-RAM/DVD-RW or the like), and the correspondence between data recorded on the disc and recording tracks.

FIG. 1 is a view for explaining the structure of recordable optical disc (DVD-RAM/DVD-RW disc or the like) 10 used in the DVD digital video recorder.

As shown in FIG. 1, this optical disc 10 has a structure obtained by adhering a pair of transparent substrates 14 each having recording layer 17 using adhesive layer 20. Each substrate 14 can be formed of a 0.6-mm thick polycarbonate film, and adhesive layer 20 can consist of a very thin (e.g., 40 μm to 70 μm thick) ultraviolet setting resin. When these pair of 0.6-mm thick substrates 14 are adhered to each other so that their recording layers 17 contact each other on the surfaces of adhesive layer 20, a 1.2-mm thick large-size optical disc 10 is obtained.

Note that each recording layer 17 can have a ROM/RAM double-layered structure. In this case, ROM layer/light reflection layer (emboss layer) 17A is formed on the side closer to read-out face 19, and RAM layer/phase change recording layer 17B is formed on the side farther from read-out face 19.

Optical disc 10 has center hole 22, and clamp areas 24 used to clamp optical disc 10 upon its rotation are formed around center hole 22 on the two surfaces of the disc. Center hole 22 receives the spindle of a disc motor when disc 10 is loaded into a disc drive device (not shown). Optical disc 10 is clamped at its clamp areas 24 by a disc clamper (not shown) during disc rotation.

Optical disc 10 has information areas 25 that can record information such as video data, audio data, and the like around clamp areas 24.

In each information area 25, lead-out area 26 is assured on the outer periphery side. Also, lead-in area 27 is assured on the inner periphery side of area 25 that contacts clamp area 24. The area between lead-out and lead-in areas 26 and 27 is defined as data recording area 28.

On recording layer (light reflection layer) 17 of information area 25, a recording track is continuously formed in, e.g., a spiral pattern. The continuous track is divided into a plurality of physical sectors, which have serial numbers. Various data are recorded on optical disc 10 using those sectors as recording units.

Data recording area 28 serves as an actual data recording area, and records video data (main picture data) such as a movie or the like, sub-picture data such as superimposed dialogs, menus, and the like, and audio data such as words, effect sounds, and the like as recording/playback information in the form of similar pit trains (physical shapes or phase states that bring about optical change in laser reflected light).

When optical disc 10 is a double-sided recording RAM disc in which each surface has one recording layer, each recording layer 17 can be formed by three layers, i.e., by sandwiching a phase-change recording material layer (e.g., Ge2Sb2Te5) between two zinc sulfide.silicon oxide (ZnS-.SiO2) mixture layers.

When optical disc 10 is a single-sided recording RAM disc in which each surface has one recording layer, recording layer 17 on the side of read-out face 19 can be formed by three layers including the aforementioned phase-change recording material layer. In this case, layer 17 on the side opposite to read-out face 19 need not be an information recording layer but may merely be a dummy layer.

When optical disc 10 is a single-sided read type double-layered RAM/ROM disc, two recording layers 17 can comprise a single phase-change recording layer (on the side farther from read-out face 19; read/write), and a single semi-transparent metal reflection layer (on the side closer to read-out face 19; read-only).

When optical disc 10 is a write-once DVD-R, a polycarbonate substrate is used, gold can be used as a reflection layer (not shown), and an ultraviolet setting resin can be used as a protection layer (not shown). In this case, an organic dye is used in recording layer 17. As the organic dyes, cyanine, squarilium, chroconic, and triphenylmenthane dyes, xanthene and quinone dyes (naphthoquinone, anthraquinone, and the like), metal complex dyes (phthalocyanine, porphyrin, dithiol complex, and the like), and so forth can be used.

Data can be written on such DVD-R disc using a semiconductor laser having a wavelength of 650 nm and an output of around 6 to 12 mW.

When optical disc 10 is a single-sided read type double-layered ROM disc, two recording layers 17 can comprise a single metal reflection layer (on the side farther from read-out face 19), and a single semi-transparent metal reflection layer (on the side closer to read-out face 19).

On read-only DVD-ROM disc 10, pit trains are formed in advance on substrate 14 by a stamper, a reflection layer of a metal or the like is formed on the surface of substrate 14 on which the pit trains are formed, and the reflection layer is used as recording layer 17. On such DVD-ROM disc 10, grooves as recording tracks are not particularly formed, and the pit trains formed on the surface of substrate 14 serve as tracks.

In various types of optical discs 10 described above, read-only ROM information is recorded on recording layer 17 as an embossed pattern signal. By contrast, no such embossed pattern signal is formed on substrate 14 having read/write (or write-once) recording layer 17, and a continuous groove is formed instead. A phase-change recording layer is formed on such groove. In case of a read/write DVD-RAM disc, the phase-change recording layer in land portions is also used for information recording in addition to the groove.

When optical disc 10 is of single-sided read type (independently of one or two recording layers), substrate 14 on the rear side viewed from read-out face 19 need not always be transparent to the read/write laser beam used. In this case, a label may be printed on the entire surface of substrate 14 on the rear side.

A DVD digital video recorder (to be described later) can be designed to attain write many/read many (read/write) for a DVD-RAM disc (or DVD-RW disc), write once/read many for a DVD-R disc, and read many for a DVD-ROM disc.

When disc 10 is a DVD-RAM (or DVD-RW), disc 10 itself is stored in cartridge 11 to protect its delicate disc surface. When DVD-RAM disc 10 in cartridge 11 is inserted into the disc drive of a DVD video recorder (to be described later), disc 10 is pulled out from cartridge 11, is clamped by the turntable of a spindle motor (not shown), and is rotated to face an optical head (not shown).

On the other hand, when disc 10 is a DVD-R or DVD-ROM, disc 10 itself is not stored in cartridge 11, and bare disc 10 is directly set on the disc tray of a disc drive.

FIG. 1 also shows the correspondence between data recording area 28 of optical disc (DVD-RAM or the like) 10 and recording tracks of data recorded there.

Recording layer 17 of information area 25 is formed with a continuous data recording track in a spiral pattern. The continuous track is segmented into a plurality of logical sectors (minimum recording units) each having a given storage size, and data are recorded with reference to these logical sectors. The recording size per logical sector is determined to be 2,048 bytes (or 2 kbytes) which are equal to one pack data length.

Data recording area 28 is an actual data recording area, which similarly records management data, main picture (video) data, sub-picture data, and/or audio data.

Note that data recording area 28 of disc 10 can be segmented into a plurality of ring-shaped (annular) recording areas (a plurality of recording zones), although not shown. The disc rotational velocity varies in units of recording zones. However, within each zone, a constant linear or angular velocity can be set. In this case, an auxiliary recording area, i.e., spare area (free space) can be provided for each zone. These free spaces in units of zones may collectively form a reserve area for that disc 10.

The recording signal structure of information recorded on an information storage medium (DVD-RAM disc 10 or the like) and the method of generating the recording signal structure will be explained below. Note that the contents themselves of information recorded on the medium are referred to as "information", and a structure or expression obtained by scrambling or modulating information with identical contents, i.e., a sequence of "1" and "0" states after signal format conversion, is expressed as a "signal" to appropriately distinguish them from each other.

Figure 2:
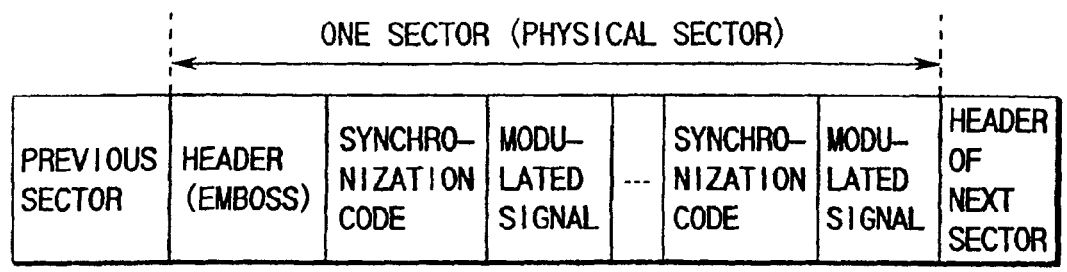
FIG. 2 is a view for explaining the structure of a sector included in the data area shown in FIG. 1.

FIG. 2 is a view for explaining the structure of a sector included in the data area shown in FIG. 1. One sector shown in FIG. 2 corresponds to one of sector numbers of 2,048-byte sectors shown in FIG. 1. Each sector alternately includes synchronization codes and modulated signals (video data and the like) to have a header embossed on disc 10.

Figure 3:
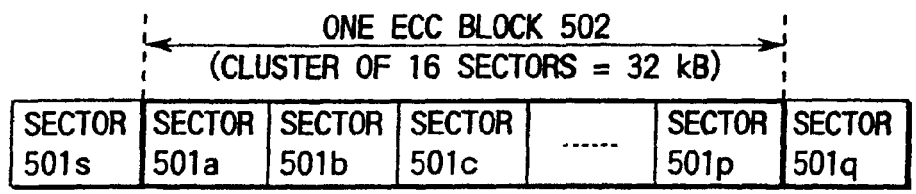
FIG. 3 is a view for explaining an ECC unit of information included in the data area shown in FIG. 1.

FIG. 3 is a view for explaining a recording unit (a unit of error correction code ECC) of information included in the data area shown in FIG. 1.

In a FAT (file allocation table) prevalently used in file systems of information storage media (hard disc HDD, magnetooptical disc MO, and the like) for personal computers, information is recorded on an information storage medium to have 256 or 512 bytes as a minimum unit.

By contrast, in information storage media such as a CD-ROM, DVD-ROM, DVD-RAM, and the like, UDF (universal disc format) is used as a file system. In this case, information is recorded on an information storage medium to have 2,048 bytes as a minimum unit. This minimum unit is called a sector. That is, each 2,048-byte information is recorded on an information storage medium (optical disc 10) using UDF in units of sectors 501, as shown in FIG. 3.

Since a CD-ROM and DVD-RAM are handled as bare discs without using any cartridge, the surface of an information storage medium is readily scratched or becomes attached with dust on the user side. For this reason, a specific sector (e.g., sector 501c in FIG. 3) cannot often be played back (or recorded) due to the influences of dust or scratches on the information storage medium surface.

DVD adopts error correction (ECC using a product code) in consideration of such situation. More specifically, 16 sectors (16 sectors from sector 501a to sector 501p in FIG. 3) form one ECC (error correction code) block 502, which has a strong error correction function. As a result, even when an error in ECC block 502 (e.g., sector 501c is impossible to play back) has occurred, such error can be corrected, and all pieces of information in ECC block 502 can be correctly played back.

Figure 4:
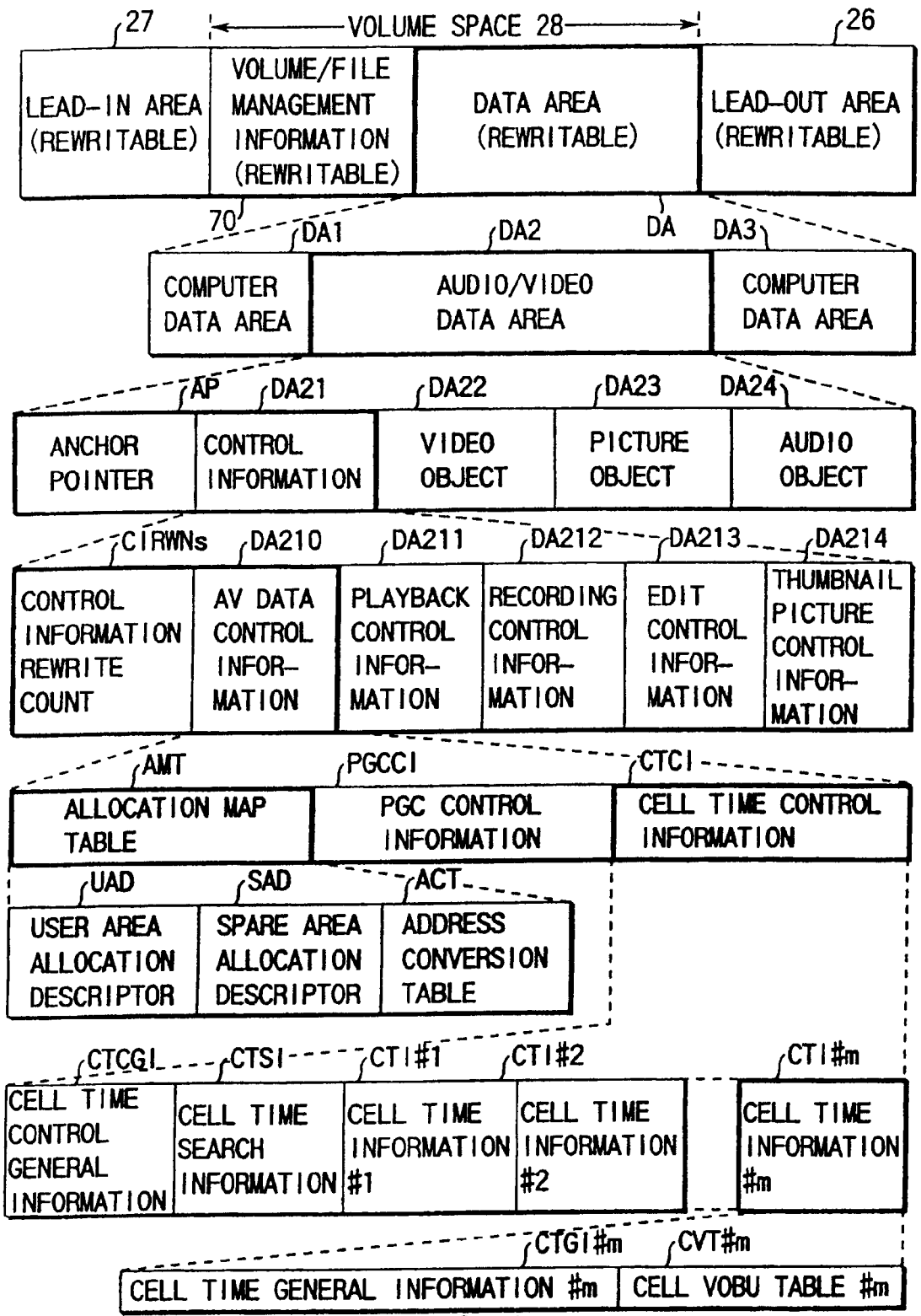
FIG. 4 is a view for explaining an example of the hierarchical structure of information recorded on the optical disc shown in FIG. 1.

FIG. 4 is a view for explaining an example of the hierarchical structure of information recorded on optical disc (especially, DVD-RAM or DVD-RW) disc 10 shown in FIG. 1.

Lead-in area 27 includes an embossed data zone whose light reflection surface has an embossed pattern, a mirror zone whose surface is flat (mirror surface), and a rewritable data zone capable of information rewrites.

Data recording area (volume space) 28 is comprised of user rewritable volume/file management information 70, and data area DA.

Data area DA between lead-in and lead-out areas 27 and 26 can record both computer data and AV data. The recording order and recording information sizes of computer data and AV data are arbitrary, and an area where computer data is recorded is named a computer data area (DA1, DA3), and an area where AV data is recorded is named an AV data area (DA2).

Volume/file management information 70 can record information that pertains to the entire volume, the number of files computer data (data of a personal computer) and the number of files associated with AV data included in volume space 28, and information that pertains to recording layer information and the like.

Especially, the recording layer information can contain:
- the number of building layers (for example, two layers in case of a single ROM/RAM double-layered disc, also two layers in case of a single double-layered disc having only a ROM layer, and n layers in case of n single-sided, single-layered discs irrespective of ROM or RAM layers);
- logical sector number range tables (indicating the size of each layer) assigned in units of layers;
- characteristics (a DVD-RAM disc, a RAM portion of a ROM/RAM double-layered disc, a DVD-R, CD-ROM, CD-R, and the like) in units of layers;
- assigned logical sector number range tables (including rewritable area size information in units of layers) in units of zones of a RAM area of each layer; and
- unique ID information (to find out disc exchange in a multiple disc pack) in units of layers.

With the recording layer information including the aforementioned contents, even a multiple disc pack and a ROM/RAM double-layered disc can be handled as a single, large volume space by setting series logical sector numbers.

Data area DA records computer data, video data, audio data, and the like. Volume/file management information 70 records information that pertains to files of audio/video data recorded on data area DA or the entire volume.

Lead-out area 26 is also capable of information rewrites.

The embossed data zone of lead-in area 27 records, for example, in advance:

<01> information which pertains to the entire information storage medium: the disc type (a DVD-ROM, DVD-RAM (or DVD-RW), DVD-R, or the like); disc size (12 cm, 8 cm, or the like); recording density; physical sector numbers indicating the recording start/end positions, and the like;

<02> information which pertains to the recording/playback/erasure characteristics: the recording power and recording pulse width; erase power; playback power; linear velocity upon recording and erasure, and the like; and <03> information which pertains to the manufacture of each information storage medium: the manufacturing number and the like.

The rewritable zone of each of lead-in area 27 and lead-out area 26, for example, includes:

<04> a field for recording a unique disc name of each information storage medium;

<05> a test recording field (for confirming recording/erasure conditions); and

<06> a field for recording management information that pertains to defective fields in data area DA.

On fields <04> to <06>, a DVD recording apparatus (a dedicated DVD video recorder, a personal computer installed with a DVD video processing board and processing software, or the like) can record information.

Data area DA can record audio/video data DA2 and computer data DA1 and DA3 together.

Note that the recording order, recording information size, and the like of computer data and audio/video data are arbitrary. Data area DA can record computer data or audio/video data alone.

Audio/video data area DA2 includes control information DA21, video object DA22, picture object DA23, and audio object DA24.

At the first position of audio/video data area DA2, anchor pointer AP having information that indicates the recording location of control information DA21 is present. When the information recording/playback system uses information in this audio/video data area DA2, the recording location of control information DA21 is checked based on anchor pointer AP, and control information DA21 is read by accessing that location.

Video object DA22 includes information of the contents of recorded video data.

Picture object DA23 can include still picture information such as still pictures, slide pictures, thumbnail pictures that represent the contents of video object DA22 used upon search/edit, and the like.

Audio object DA24 includes information of the contents of recorded audio data.

Note that recording information of the playback target (contents) of audio/video data is included in video object set VOBS shown in FIG. 5 (to be described later).

Control information DA21 includes AV data control information DA210, playback control information DA211, recording control information DA212, edit control information DA213, and thumbnail picture control information DA214.

AV data control information DA210 includes information which manages the data structure in video object DA22 and manages information that pertains to the recording locations on information storage medium (optical disc or the like) 10, and information CIRWNs indicating the number of times of rewrite of control information.

Playback control information DA211 includes control information required upon playback, and has a function of designating a sequence of program chains PGC. More specifically, playback control information DA211 includes: information that pertains to a playback sequence which combines PGCs; information indicating a "pseudo recording location" while considering information storage medium 10 as, e.g., a single tape (digital video cassette DVC or video tape VTR) in association with that information (a sequence for continuously playing back all recorded cells); information that pertains to multi-screen simultaneous playback having different video information contents; search information (information that records corresponding cell IDs and a table of the start times of cells in units of search categories, and allows the user to select a category to directly access the video information of interest); and the like.

With this playback control information DA211, the file name of an AV file, the path of a directory name, the ID of PGC, and the cell ID can be designated.

Recording control information DA212 includes control information (programmable timer recording information or the like) required upon recording (video recording and/or audio recording).

Edit control information DA213 includes control information required upon edit. For example, edit control information DA213 can include special edit information (EDL information such as corresponding time setting information, special edit contents, and the like) in units of PGCs, and file conversion information (information that converts a specific portion in an AV file, and designates the file storage location after conversion, or the like).

Thumbnail picture control information DA214 includes management information that pertains to thumbnail pictures used to search for a scene that the user wants to see in video data or those to be edited, and thumbnail picture data.

Thumbnail picture control information DA214 can include a picture address table, thumbnail picture data, and the like. Thumbnail picture control information DA214 can also include, as lower-layer information of the picture address table and thumbnail picture data, menu index information, index picture information, slide & still picture information, information picture information, defective area information, wallpaper picture information, and the like (not shown).

AV data control information DA210 includes allocation map table AMT, program chain control information PGCCI, and cell time control information CTCI.

Allocation map table AMT includes information that pertains to address setups along the actual data allocation, identification of recorded/unrecorded areas, and the like on the information storage medium (optical disc 10 or the like). In the example shown in FIG. 4, allocation map table AMT includes user area allocation descriptor UAD, spare area allocation descriptor SAD, and address conversion table ACT.

Program chain control information PGCCI includes information that pertains to a video playback program (sequence).

Cell time control information CTCI includes information that pertains to the data structure of a basic unit (cell) of video information. This cell time control information CTCI includes cell time control general information CTCGI, cell time search information CTSI, and m pieces of cell time search information CTI #1 to CTI #m.

Cell time control general information CTCGI includes information that pertains to individual cells. Cell time search information CTSI is map information indicating a description position (AV address) of corresponding cell time information when a specific cell ID is designated.

Each cell time search information (CTI #m) is comprised of cell time general information CTGI #m and cell VOBU table CVT #m. Details of cell time search information (CTI #m) will be explained later with reference to FIG. 8.

An outline of FIG. 4 has been explained. Supplementary explanations of the individual information will be summarized below.

<11> Volume/file management information 70 includes:
information that pertains to entire volume space 28;
the number of files of computer data (DA1, DA3) and audio/video data (AV data DA2) included in volume space 28;
the recording layer information of the information storage medium (DVD-RAM disc, DVD-ROM disc, or DVD-ROM/RAM multi-layered disc); and the like.

The recording layer information records:
the number of building layers (example: the number of layers of a single RAM/ROM double-layered disc is counted as two, that of a single ROM double-layered disc is also counted as two, and that of n single-sided discs is counted as n);
logical sector number range tables (corresponding to the size of each layer) assigned in units of layers;
characteristics (example: a DVD-RAM disc, a RAM portion of a ROM/RAM double-layered disc, CD-ROM, CD-R, and the like) in units of layers;
assigned logical sector number range tables (including rewritable area size information in units of layers) in units of zones of a RAM area of each layer;

unique ID information (e.g., to find out disc exchange in a multiple disc pack) in units of layers; and the like. With this information, series logical sector numbers can be set even for a multiple disc pack or RAM/ROM double-layered disc to handle it as a single, large volume space.

<12> Playback control information DA211 records:

information that pertains to a playback sequence which combines PGCs;

"information indicating a pseudo recording location" while considering information storage medium 10 as, e.g., a single tape (digital video cassette DVC or video tape VTR) in association with the playback sequence that combines PGCs (a sequence for continuously playing back all recorded cells);

information that pertains to multi-screen simultaneous playback having different video information contents;

search information (information that records corresponding cell IDs and a table of the start times of cells in units of search categories, and allows the user to select a category to directly access the video information of interest); and the like.

<13> Recording control information DA212 records:

programmable timer recording information; and the like.

<14> Edit control information DA213 records:

special edit information (that describes corresponding time setting information and special edit contents as an edit library (EDL)) in units of PGCs;

file conversion information (information that converts a specific portion in an AV file, and designates the file storage location after conversion, or the like); and the like.

Figure 5:
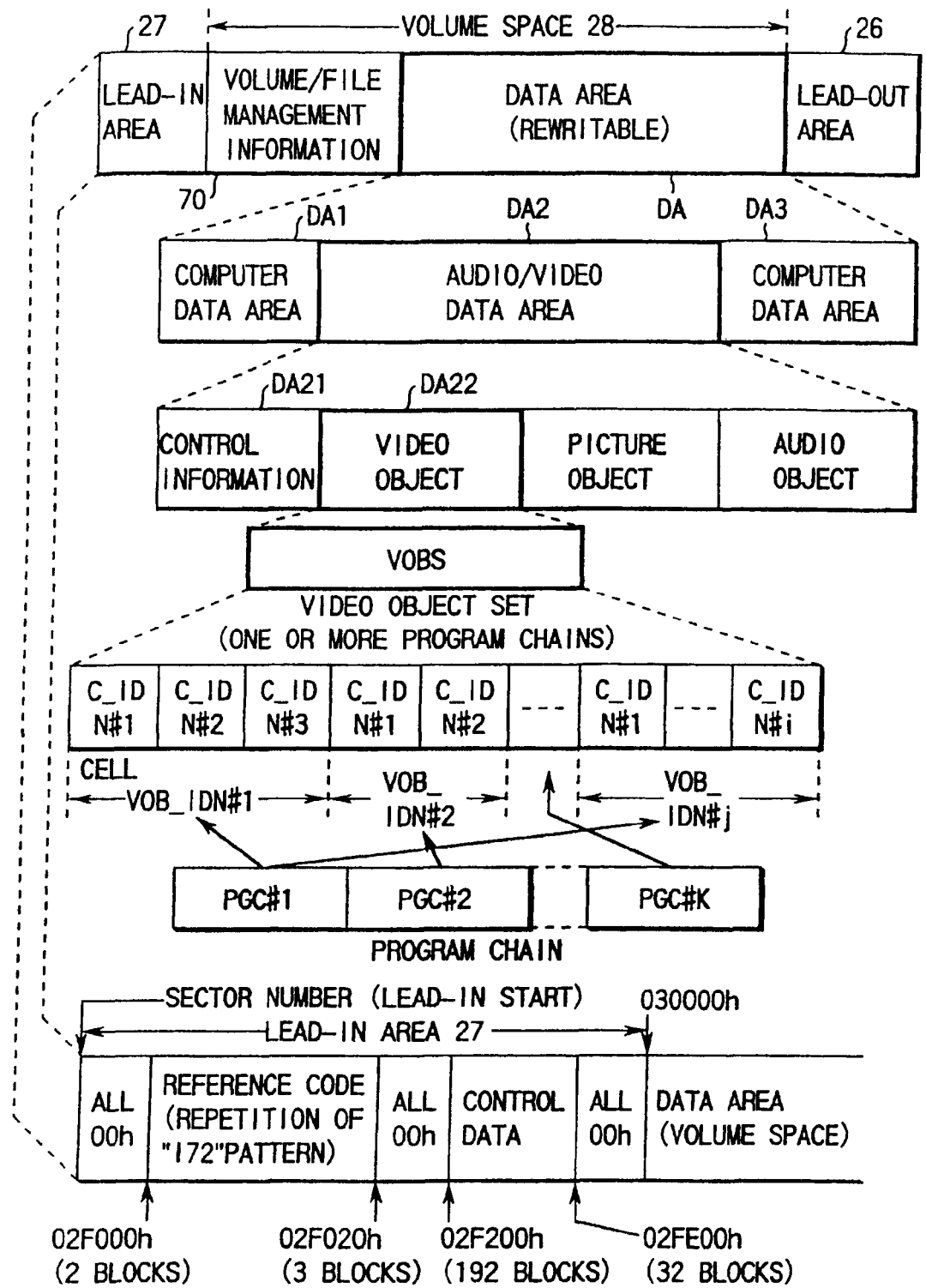
FIG. 5 is a view that exemplifies the correspondence between the cell configuration of a video object and program chain PGC in the information hierarchical structure shown in FIG. 4, and the recorded contents of a lead-in area.

FIG. 5 exemplifies the correspondence between the cell configuration of a video object and program chain PGC in the information hierarchical structure shown in FIG. 4, and also exemplifies the recorded contents of the lead-in area.

In the information hierarchical structure shown in FIG. 5, video object DA22 is comprised of video object set VOBS. This VOBS has contents corresponding to one or more program chains PGC#1 to PGC#k which respectively designate the cell playback order in different methods.

A video object set (VOBS) is defined as a set of one or more video objects (VOB). Video objects VOB in video object set VOBS are used for the same purpose.

For example, a VOBS for a menu normally consists of one VOB, which stores a plurality of menu screen display data. By contrast, a VOBS for a title set normally consists of a plurality of VOBs.

Taking a concert video title of a certain rock band as an example, VOBs that form a video object set (VTSTT_VOBS) for a title set correspond to picture data of the performance of that band. In this case, by designating a given VOB, for example, the third tune in the concert of that band can be played back.

A VOB that forms video object set VTSM_VOBS for a menu stores menu data of all the tunes performed in the concert of the band, and a specific tune, e.g., an encore, can be played back according to the menu display.

Note that one VOB can form one VOBS in a normal video program. In this case, a single video stream comes to an end in one VOB.

On the other hand, in case of a collection of animations having a plurality of stories or an omnibus movie, a plurality of video streams (a plurality of video chains PGC) can be set in a single VOBS in correspondence with the respective stories. In this case, the individual video streams are stored in corresponding VOBs. An audio stream and sub-picture stream pertaining to each video stream end in the corresponding VOB.

VOBs are assigned identification numbers (VOB_IDN #i; i=0 to i), and that VOB can be specified by the identification number. A VOB consists of one or a plurality of cells. A normal video stream consists of one or a plurality of cells, but a video stream for a menu often consists of a single cell. Cells are assigned identification numbers (C_IDN#j) like VOBs.

FIG. 5 also exemplifies the logical structure of information recorded on lead-in area 27 of optical disc 10 shown in FIG. 1.

When disc 10 is set in a DVD video recorder (not shown) (or a DV video player; not shown), information in lead-in area 27 is read first. Lead-in area 27 records a predetermined reference code and control data in ascending order of sector number.

The reference code in lead-in area 27 includes a predetermined pattern (a repetitive pattern of a specific symbol "172") and consists of two error correction code blocks (ECC blocks). Each ECC block has 16 sectors. These two ECC blocks (32 sectors) are generated by appending scramble data. Upon playing back the reference code appended with the scramble data, filter operation or the like on the playback side is done to play back a specific data symbol (e.g., 172) to assure precision in subsequent data reads.

Control data in lead-in area 27 is made up of 192 ECC blocks. In this control data field, the contents for 16 sectors in the respective blocks are repetitively recorded 192 times.

Figure 6:
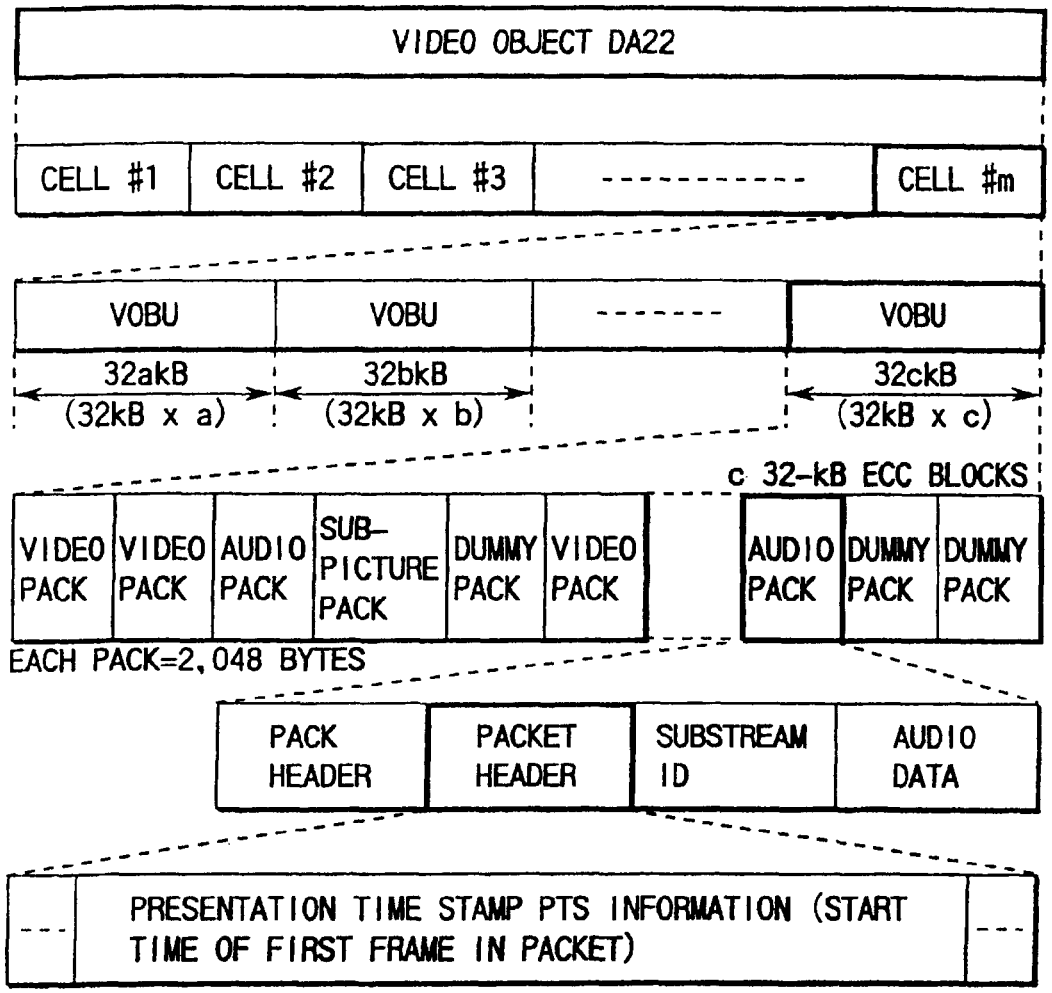
FIG. 6 is a view that exemplifies the hierarchical structure of information included in a video object shown in FIG. 5.

FIG. 6 exemplifies the hierarchical structure of information included in video object DA22 shown in FIG. 5.

As shown in FIG. 6, each cell (for example, cell #m) consists of one or more video object units (VOBU). Each video object unit is constituted as a set (pack sequence) of video packs, sub-picture packs, and audio packs.

Each of these packs has a size of 2,048 bytes, and serves as a minimum unit for data transfer. The minimum unit for logical processing is a cell, and logical processing is done in units of cells.

The playback time of video object unit VOBU corresponds to that of video data made up of one or more picture groups (groups of pictures; to be abbreviated as GOPs), and is set to fall within the range from 0.4 sec to 1.2 sec. One GOP is screen data which normally has a playback time of about 0.5 sec in the MPEG format, and is compressed to play back approximately 15 frame pictures during this interval.

When video object unit VOBU includes video data, a video datastream is formed by arranging GOPs (complying with MPEG) each consisting of video packs, sub-picture packs, audio packs, and the like. Also, video object unit VOBU is defined by one or more GOPs.

Even playback data consisting of audio data and/or sub-picture data alone is formed using video object unit VOBU as one unit. For example, when video object unit VOBU is formed by audio packs alone, audio packs to be played back in the playback time of video object unit VOBU to which the audio data belong are stored in that video object unit VOBU as in the video object of video data.

The packs that form each video object unit VOBU have the same data structure except for a dummy pack. Taking an audio pack as an example, as shown in FIG. 6, a pack header is set at the head of the pack, and a packet header, substream ID, and audio data follow. In such pack configuration, the packet header is written with information of presentation time stamp PTS indicating the head time of the first frame in a packet.

With a DVD video recorder that can record video title set VTS (or video program) containing video object DA22 with the structure shown in FIG. 6 on optical disc 10, the user often wants to edit the recorded contents after this VTS is recorded. In order to meet such requirement, dummy packs can be appropriately inserted in each VOBU. Each dummy pack can be used to record edit data later.

Information that pertains to cells #1 to #m shown in FIG. 6 is recorded in cell time control information CTCI in FIG. 4 and, as shown in FIG. 4, its contents include:

cell time information CTI#1 to cell time information CTI (information that pertains to each cell);

cell time search information CTSI (map information indicating a description position (AV address) of corresponding cell time information when a specific cell ID is designated); and cell time control general information CTCGI (information that pertains to the entire cell information).

Each cell time information (e.g., CTI#m) includes cell time general information (CTGI#m) and a cell VOBU table (CVT#m).

The data structure in video object DA22 will be explained below.

A minimum basic unit of video information is called a cell. Data in video object DA22 is configured as a set of one or more cells #1 to #m, as shown in FIG. 6.

MPEG2 (or MPEG1) is prevalently used as the video information compression technique in video object DA22. MPEG segments video information into groups called GOPs in 0.5-sec increments, and compresses video information in units of GOPs. A video information compression unit called video object unit VOBU is formed by one or more GOPs.

In the present invention, the VOBU size is set to match an integer multiple of ECC block size (32 kbytes) (one of important features of the present invention).

Furthermore, each VOBU is segmented into packs in units of 2,048 bytes, and these packs record raw video information (video data), audio information (audio data), sub-picture information (superimposed dialog data, menu data, and the like), dummy information and the like. These are recorded in the form of video packs, audio packs, sub-picture packs, and dummy packs.

Note that the dummy pack is inserted for the purposes of:

addition of information to be additionally recorded after video recording (for example, memo information indicating that postrecording information is inserted into an audio pack and is replaced by a dummy pack is inserted in a sub-picture pack as sub-picture information and is replaced by a dummy pack);

compensating for a size that is short from an integer multiple of 32 kbytes to adjust the VOBU size just to an integer multiple of ECC block size (32 kbytes); and the like.

In each pack, a pack header and packet header (and substream ID) are set before object data (audio data in case of, e.g., an audio pack).

In the DVD video format, an audio pack and sub-picture pack include the substream ID between the packet header and object data.

In the packet header, a time code for time management is recorded. Taking an audio packet as an example, PTS (presentation time stamp) information that records the head time of the first audio frame in that packet is inserted in the form shown in FIG. 6.

Figure 7:
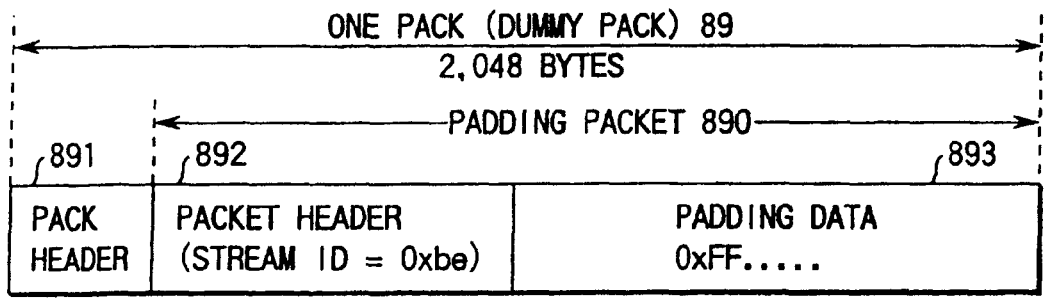
FIG. 7 is a view for explaining the contents of a dummy pack shown in FIG. 6.

FIG. 7 shows the structure of the contents (for one dummy pack) of the dummy pack shown in FIG. 6. That is, one dummy pack 89 is comprised of pack header 891, packet header 892 having a predetermined stream ID, and padding data 893 padded with a predetermined code (insignificant data). (Packet header 892 and padding data 893 form padding packet 890). The contents of padding data 893 of an unused dummy pack do not have any special meaning.

This dummy pack 89 can be used as needed when the recorded contents are edited after predetermined recording is done on disc 10 shown in FIG. 1. Also, dummy pack 89 can be used to store thumbnail picture data, which is used for a user menu. Furthermore, dummy pack 89 can be used for the purpose of matching each VOBU size in AV data DA2 with an integer multiple of 32 kbytes (32-kbyte align).

For example, a case will be examined below wherein the contents of a video tape that recorded a family trip using a portable video camera are recorded and edited on DVD-RAM (or DVD-RW) disc 10.

In this case, only the video scenes to be stored in a single disc are selectively recorded on disc 10. These video scenes are recorded in a video pack in FIG. 6. Also, audio data simultaneously recorded by the video camera is recorded in an audio pack.

Each VOBU that includes these video pack, audio pack, and the like can have a navigation pack (not shown), which is adopted in DVD video, at its beginning, as needed.

This navigation pack contains playback or presentation control information PCI and data search information DSI. Using this PCI or DSI, the playback procedure of each VOBU can be controlled (for example, discontinuous scenes can be automatically connected or a multiangle scene can be recorded).

Alternatively, each VOBU may have a synchronization navigation pack (SNV_PCK; not shown) which simply has synchronization information in units of VOBUs without having contents as complex as those of a navigation pack of DVD video.

Note that a DVD video RAM assumes a case without using any navigation pack currently. However, a DVD-R may use a navigation pack.

After the contents of the video tape are edited and recorded on disc 10, when a voice, effect sound, and the like are to be postrecorded in each scene in units of VOBUs or background music BGM is added, such postrecorded audio data or BGM can be recorded in dummy pack 89. When a comment for the recorded contents is to be added, sub-pictures such as additional characters, figures, and the like can be recorded in dummy pack 89. Furthermore, when an additional video picture is to be inserted, the inserted video picture can be recorded in dummy pack 89.

The above-mentioned postrecorded audio data or the like is written in padding data 893 of dummy pack 89 used as an audio pack. The additional comment is written in padding data 893 of dummy pack 89 used as a sub-picture pack. Similarly, the inserted video picture is written in padding data 893 of dummy pack 89 used as a video pack.

Furthermore, when each VOBU size including the recorded/edited pack sequence does not match an integer multiple of ECC block size (32 kbytes), dummy pack 89 which includes as padding data 893 insignificant data that can match this VOBU size with an integer multiple of 32 kbytes can be inserted into each VOBU.

In this manner, by appropriately inserting a dummy pack (padding pack) into each recorded/edited VOBU to match each VOBU size with an integer multiple of ECC block size (the aforementioned 32-kbyte align), all VOBUs can be always be rewritten in units of ECC blocks.

Alternatively, when 32-kbyte align is done, if a RAM layer of disc 10 has suffered a defect, only the defect portion can be replaced in units of ECC blocks. Furthermore, when the ECC block unit is used as the address unit of AV data, each VOBU address can be easily converted.

That is, dummy pack 89 is a wildcard pack that can become any of audio, sub-picture, and video packs depending on its purpose.

FIG. 8 is a view for explaining the internal structure of cell time information CTI shown in FIG. 4.

As has been explained in the description of FIG. 4, each cell time search information (CTI#m) is made up of cell time general information CTGI#m and cell VOBU table CVT#m.

As shown in the upper half of FIG. 8, the cell time general information includes:

(1) cell data general information;
(2) a time code table;
(3) acquired defect information;
(4) cell video information;
(5) cell audio information; and
(6) cell sub-picture information.

Cell data general information (1) contains a cell ID, the total time duration of that cell, the number of cell data sets (extents), a cell data set descriptor, a cell time physical size, and the number of constituent VOBUs of that cell.

Note that the cell ID is a unique ID in units of cells. The total time duration indicates the total time required for playing back that cell.

The number of cell data sets (number of extents) indicate the number of cell data set descriptors in that cell.

The description contents of the cell data set descriptor (cell data extent descriptor) will be explained below.

Assume that a recording information cluster, which pertains to a single cell in the layout order of ECC blocks that can be used is one cell data set (cell data extent). In this case, specific cell #1 is considered as one cell data set unless it is divided by another cell #2.

As an example of a description method, the length (the number of ECC blocks where a cell data set is recorded) of the cell data set is expressed by "2 bytes", the start address (AV address) of the cell data set is expressed by "3 bytes", and they are described at neighboring positions. For example, we have:

Cell data set descriptor (the number of ECC blocks, start address)=CED(*,*)

A statement that describes all cell data sets that form one cell is a cell data set descriptor. With this descriptor, the distribution of all AV addresses where cells are recorded can be determined, thus allowing easy access.

Since the lengths of cell data sets and the start AV addresses of cell data sets are described in pairs, when many continuously recorded areas are formed on information storage medium 10, the number of bytes required for describing the cell data set descriptor decreases, the data size required for the cell time general information (#m) decreases, and the recording size that can be used for video object DA22 can be relatively increased accordingly.

Note that corresponding AV addresses viewed along the layout of information storage medium 10 are often arranged in a discontinuous order. However, since allocation map table AMT shown in FIG. 4 is available, the recording locations of all data in a given cell on the information storage medium can be specified by the start AV address in the cell data set descriptor.

In FIG. 8, the cell time physical size indicates a recording location size on the information storage medium where a cell including an inherent defect location is recorded. By combining this cell time physical size and the total time duration, the size of an inherent defective area in a given cell can be detected, and a practical transfer or transmission rate can be expected. This cell time physical size can be used to determine a recording location candidate of a cell that can guarantee continuous playback.

The number of constituent VOBUs indicates the number of VOBUs that constitute that cell.

Time code table (2) includes information of the number of pictures in VOBUs #1 to #n which form the cell, and information of the number of ECC blocks in VOBUs #1 to #n which form the cell (as shown in FIG. 3, since one ECC block=16 sectors, the information of the number of ECC blocks can also be expressed by information of the number of sectors).

A time code in this table is expressed by a pair of the number of pictures (the number of video frames; expressed by 1 byte) in units of VOBUs in the cell of interest, and the number of used ECC blocks (expressed by 1 byte) in units of VOBUs at the recording location on the medium indicated by the cell data set descriptor. Using this expression method, the time code can be recorded in a very small information size (compared to a case wherein time codes are appended to each of 30 frames per sec in NTSC).

Acquired defect information (3) includes the number of acquired defects in that cell, and information of the addresses of the acquired defects.

The number of acquired defects indicates the number of ECC blocks that have suffered acquired defects in that cell. The acquired defect address indicates the location of each acquired defect by an AV address in units of ECC blocks. Every time a defect is produced upon cell playback (i.e., ECC error correction fails), the AV address of the defective ECC block is registered as the acquired defect address.

Cell video information (4) includes information such as the type of video information (NTSC, PAL, or the like) of that cell, a compression method (MPEG2, MPEG1, motion JPEG, or the like), a stream ID and substream ID (main screen or sub screen; used in multi-screen simultaneous recording/playback), a maximum transmission rate, and the like.

Cell audio information (5) includes information such as the type of an audio signal (linear PCM, MPEG1, MPEG2, Dolby AC-3, or the like), a sampling frequency (48 kHz or 96 kHz), the number of quantization bits (16 bits, 20 bits, or 24 bits), and the like.

Cell sub-picture information (6) includes the number of sub-picture streams in each cell and information indicating their recording locations.

On the other hand, the cell VOBU table includes VOBU information #1 to VOBU information #n which form that cell, as shown in the lower half of FIG. 8. Each VOBU information includes VOBU general information, dummy pack information, and audio synchronization information.

The individual information contents in the cell time information (CTI in) in FIG. 8 can be summarized as follows:

(11) cell data general information (general information that pertains to each cell and includes the following contents);
  (11.1) cell ID (unique identifier for each cell)
  (11.2) total time duration (total required time required for playing back cell contents)
  (11.3) the number of cell data sets (the number of cell data set descriptors in a cell)
  (11.4) cell data set descriptor
  (11.5) cell time physical size (which indicates the recording location size on the information storage medium where a cell including an inherent defect location is recorded. By combining with the aforementioned "total time duration", the size of an inherent defective area in the cell can be determined, and a practical transmission rate can be expected. This information is used to "determine a recording location candidate of a cell that can guarantee continuous playback".)

(11.6) the number of constituent VOBUs (the number of VOBUs that constitute a cell)

(12) time code table;

(13) acquired defect information (acquired defect information detected in a cell, which includes the following contents);

(13.1) the number of acquired defects (the number of ECC blocks in which acquired defects that have suffered acquired defects in a cell)

(13.2) acquired defect address (which indicates the location of acquired defect by an AV address value in units of ECC blocks. The address value is registered as needed every time a defect is produced upon playback of a cell.)

(14) cell video information (including the following contents);

(14.1) video signal type (NTSC or PAL)

(14.2) compression method (MPEG2, MPEG1, or motion JPEG)

(14.3) stream ID and substream ID information (main screen or sub screen R used in multi-screen simultaneous recording/playback)

(14.4) maximum transmission rate

(15) cell audio information (including the following contents);

(15.1) signal type (linear PCM, MPEG1, MPEG2, or Dolby AC-3)

(15.2) sampling frequency (15.3) the number of quantization bits

(16) cell sub-picture information (which indicates the number of streams of sub-picture information in each call and their recording locations.)

The aforementioned "time code table" is expressed by pairs of the numbers (the numbers of frames: expressed by 1 byte) #1 to #n of pictures in units of VOBUs in a cell, and the numbers (expressed by 1 byte) of used ECC blocks in units of VOBUs at the recording locations on the information storage medium indicated by the "cell data set descriptor", as indicated in the upper portion in FIG. 8.

Using this expression method, the time code can be recorded with a very small information size.

An access method using this time code will be explained below.

1. A video recording/playback application designates the cell ID to be accessed and its time;

2. the video management layer detects the picture number (frame number) of the corresponding picture (video frame) from the cell start position on the basis of the designated time;

3. the video management layer computes by sequentially summing up the number of pictures (the number of frames) in units of VOBUs from the head of the cell shown in FIG. 8 to detect a picture number (frame number) and VOBU number from the head to which the picture (frame) designated by the video recording/playback application corresponds;

4. the recording locations of all data in the cell on the information storage medium are detected from the cell data set descriptor shown in FIG. 8 and allocation map table AMT shown in FIG. 4;

5. the values of the numbers (#1 to #n) of ECC blocks of VOBUs (#n) in FIG. 8 are summed up to the VOBU number (#n) detected in item "3." above, and the AV address at the corresponding VOBU start position is checked;

6. the corresponding VOBU start position is directly accessed on the basis of the result in item "5." above to trace until the predetermined picture (frame) obtained in item "3." above is reached; and 7. at this time, when I-picture recording end position information in the VOBU to be accessed is required, I-picture end position information in FIG. 9 is used.

FIG. 9 is a view for explaining the internal structure of the cell VOBU table (VOBU information) shown in FIG. 8.

Time management information (presentation time stamp PTS) that pertains to audio information is recorded in a packet header, as shown in FIG. 6. In order to extract this information (PTS), information of an audio pack must be directly played back. However, since the audio pack is recorded at a location deep inside the management layer, editing of video information in units of cells becomes time-consuming.

To combat this problem of "time-consuming editing in units of cells" and the like, synchronization information for audio information is provided in AV data control information DA210 in FIG. 4. This synchronization information is audio synchronization information shown in FIG. 9.

Referring to FIG. 9, VOBU general information indicates the end position of I-picture of MPEG-encoded video information, and is expressed by a differential address from the start position of a VOBU at the last position of I-picture (1 byte).

Dummy pack information is expressed by the number of dummy packs (1 byte) indicating the number of dummy packs (FIG. 7) inserted into respective VOBUs, and the dummy pack distribution (dummy pack numbers×2 bytes) including the differential address from the start position of a given VOBU to the dummy pack insertion position (2 bytes) and the individual numbers of dummy packs (2 bytes).

Audio synchronization information is expressed by an audio stream channel number (1 byte) indicating the number of channels of an audio stream, I-picture audio positions #1, #2, . . . (1 byte each; the most significant bit designates the direction of a position including another concurrent audio pack . . . "0"=backward, "1"=forward), each of which indicates the differential address value of an ECC block that includes an audio pack of the same time as the I-picture start time from the head of a VOBU, I-picture start audio sample numbers #1, #2, . . . (2 bytes each), each of which indicates the sample number of the audio sample position of the same time as the I-picture start time in a given ECC block as a coefficient of serial numbers of all audio packs, audio synchronization information flags #1, #2, . . . (1 byte each), each of which indicates the presence/absence of synchronization information between audio and video streams, and audio synchronization data (2 bytes) which is appended to each audio synchronization information flag only when the audio synchronization information flag indicates the "presence of synchronization information", and indicates the number of audio samples included in a corresponding VOBU.

Each of I-picture start audio positions #1, #2, . . . in FIG. 9 indicates the differential address value of an ECC block that includes an audio pack of the same time as the I-picture start time from the head of the corresponding VOBU.

Furthermore, I-picture start audio positions #1, #2, . . . in FIG. 9 indicate the audio sample positions of the same time as the I-picture start time as counts of serial numbers of all audio packs.

For example, upon dividing AV information in a given cell in video editing, when a VOBU in that cell is divided into two VOBUs and each divided information is re-encoded, division free from any interrupt of playback tones and any phase shift between playback channels can be implemented using the aforementioned information (I-picture start audio position #1 and I-picture start audio sample number #1) in FIG. 9.

An example of this point will be explained below.

The frequency shift of the reference clocks of a normal digital audio recorder is approximately 0.1%. When sound source information digitally recorded by a digital video tape (DAT) recorder is overdubbed on video information already recorded on a DVD-RAM disc by digital copy, the reference clocks between the video information and audio information may have an error of around 0.1%. Such reference clock error becomes so large that it cannot be ignored upon repeating the digital copy (or nonlinear edit using a personal computer or the like), and appears as interrupted playback tones or a phase shift between playback channels.

In an embodiment of the present invention, synchronization information can be recorded as an option to synchronously play back video information and audio information (or to attain phase synchronization among channels of multi-channel audio data) even when the reference clocks of audio information have shifted.

More specifically, in the audio synchronization information in FIG. 9, the presence/absence of synchronization information between audio and video streams can be set in units of audio stream IDs (#1, #2, . . . ).

When this audio synchronization information is present, the number of audio samples is described in units of VOBUs in audio synchronization data in that information. Using this information (the number of audio samples), synchronization between video information and audio information or synchronization between channels of multi-channel audio data can be attained in units of VOBUs in each audio stream upon playback.

Figure 10:
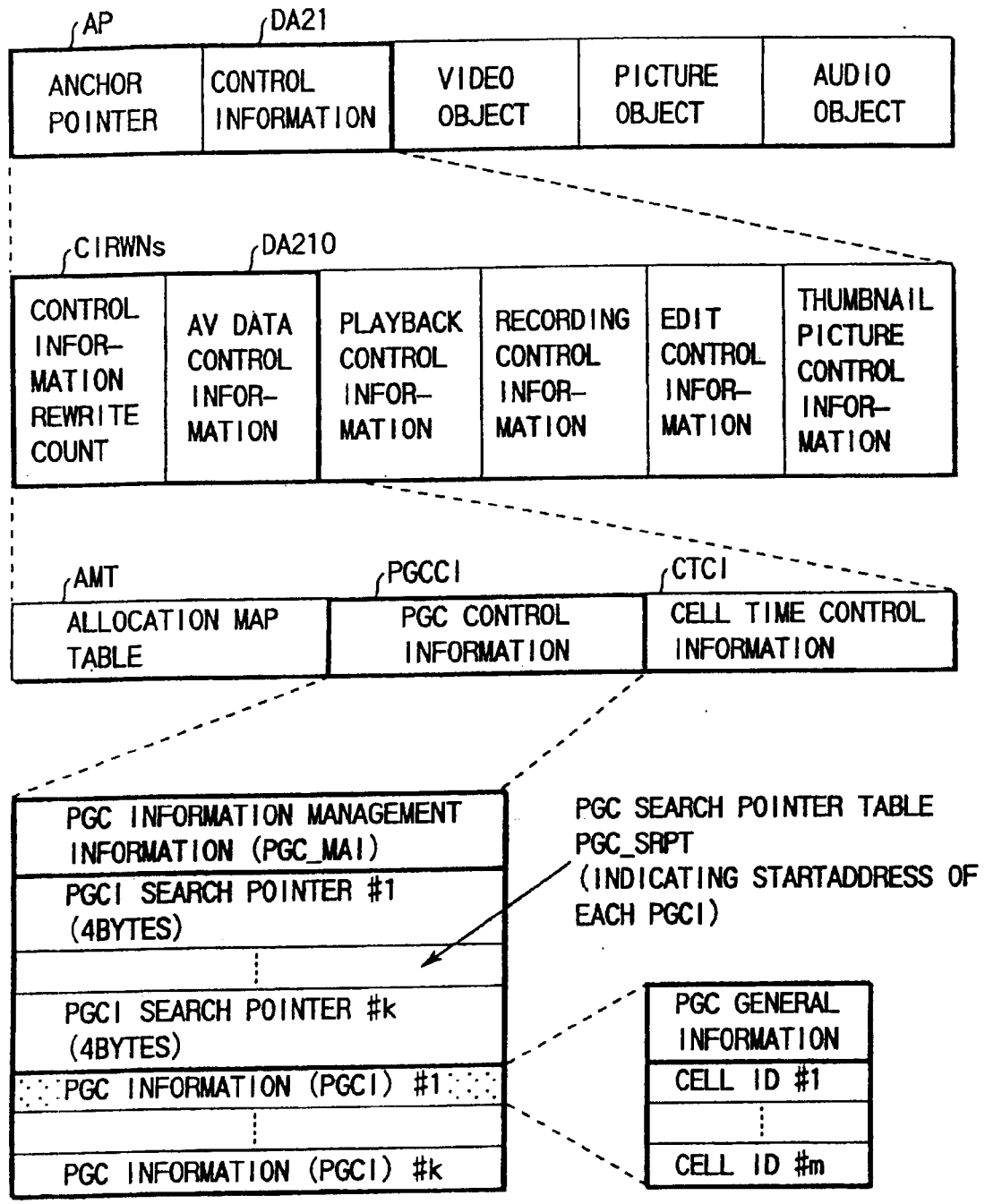
FIG. 10 is a view that exemplifies the hierarchical structure of information included in control information DA21 shown in FIG. 4.

FIG. 10 exemplifies the hierarchical structure of information included in control information DA21 in FIG. 4.

Each cell in FIG. 5 or 6 indicates a playback period that designates playback data by its start and end addresses. On the other hand, program chain PGC in FIG. 5 is a series of playback execution units that designate the playback order of cells. Playback of video object set VOBS in FIG. 5 is determined by program chains PGC and cells that form video object set VOBS.

AV data control information DA210 in FIG. 10 has control information PGCCI of such program chain PGC. This PGC control information PGCCI is made up of PGC information management information PGC_MAI, k (one or more) PGC information search pointers, and k (one or more) pieces of PGC information, the number of which is equal to that of the PGC information search pointers.

PGC information management information PGC_MAI includes information indicating the number of PGCs. Each PGC information search pointer points to the head of each PGC information PGCI, and allows easy search for corresponding PGC information PGCI.

Each PGC information PGCI includes PGC general information and m pieces of cell playback information. This PGC general information includes a PGC playback time and the number of pieces of cell playback information.

Problems posed when the position of a sector as a minimum unit of address has deviated from that of video object unit VOBU shown in FIG. 6 will be explained below with reference to FIG. 11.

Figure 11:
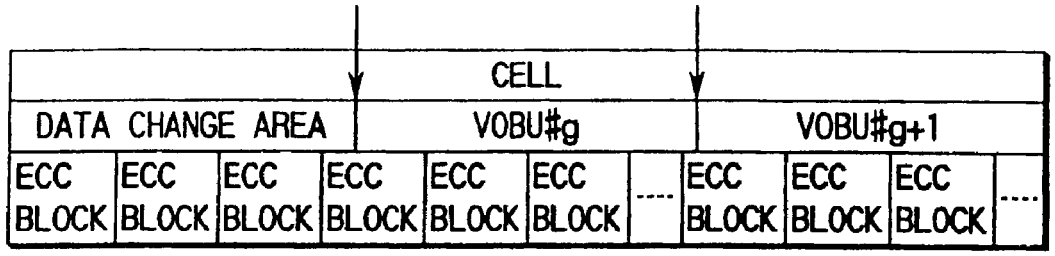
FIG. 11 is a view for explaining a case wherein the boundary positions of video object units VOBU in a cell shown in FIG. 6 deviate from those of blocks (a 32-kbyte ECC block is formed by 16 sectors (2 kbytes per sector: minimum unit)) that form data in the cell.

When new information is recorded on a data change area in FIG. 11 or information there is updated, complicated processes which:

1) play back an ECC block present at the start position of VOBU#g;

2) deinterleave the ECC block;

3) change information of a portion that pertains to the data change area in the ECC block;

4) re-assign error correction codes in the ECC block; and 5) overwrite changed information at the ECC block position are required. As a consequence, a continuous recording process in NTSC video recording that requires a frame rate of 30 frames per sec is disturbed.

Furthermore, when the surface of an information storage medium (DVD-RAM disc 10) has dust or scratches, a recording process is influenced more seriously by such dust or scratches than a playback process.

More specifically, when dust or scratches are present near that position of an ECC block which includes a sector that is to undergo processes 1) to 5) above, VOBU#g has been played back without any problem so far, but an information defect is produced by a rewrite process of the ECC block including that sector, and it may become impossible to play back VOBU#g.

Also, every time information is rewritten in a data change area which is not relevant to VOBU#g, the start position of VOBU#g is required. A phase change recording film used as the recording material of the DVD-RAM disc has a tendency that its characteristics deteriorate after repetitive recording and defects increase. Hence, it is preferable to minimize the number of times of rewrite of a portion which need not be rewritten (the start position of VOBU#g in FIG. 11) (the number of times of rewrite can be recorded in control information rewrite count CIRWNs in FIG. 4).

For these reasons, in order to guarantee a continuous recording process at a frame rate of 30 frames per sec, to minimize the number of times of rewrite of unwanted portions, and so forth, in the present invention, the VOBU recording unit is set to match an integer multiple of ECC block size (32 kbytes), as shown in FIG. 6 (note that 2 kbytes of a sector are used as a minimum unit of address). This process is called 32-kbyte align.

To attain 32-kbyte align, i.e., to set each VOBU size to always match an integer multiple of 32 kbytes before and after data change, a dummy pack (FIG. 7) having an appropriate size is inserted into each VOBU.

A method of setting an AV address number set based on the aforementioned condition (32-kbyte align that sets the recording unit to match an integer multiple of ECC block size) will be explained below compared to another logical block number assignment method.

In order to allow easy conversion to logical block numbers used in the file system, losses or repetitions of numbers due to replace processes for defects produced on information storage medium 10 are avoided.

Upon recording video information, a replace process is done for a defect on the information storage medium. At this time, the setting location of an AV address moves on information storage medium 10 as a result of this replace process.

Let "AVA" be the AV address number, "LBN" be the logical block number, and "LBNav" be the logical block number at the AV file start position. Then, the logical block number and AV address number satisfy:

$$AVA = (LBN - LBNav) \div 16$$

Note that digits after the decimal point of the quotient obtained upon division by 16 are dropped.

Figure 12:
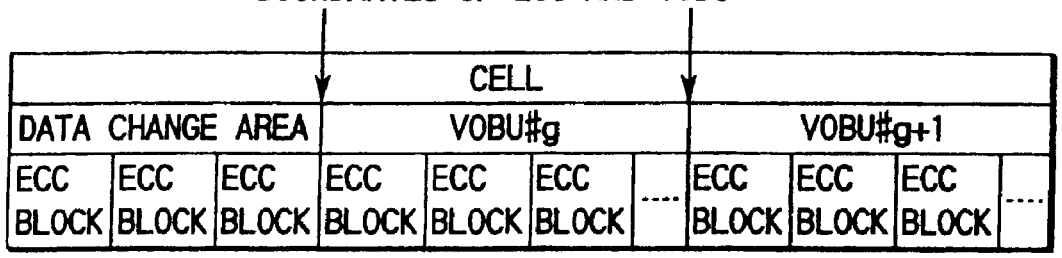
FIG. 12 is a view for explaining a case wherein the boundary positions of video object units VOBU in a cell shown in FIG. 6 match those of blocks (2 kbytes per sector: minimum unit) that form data in the cell.

FIG. 12 shows a case wherein the 32-kbyte align is executed by inserting a dummy pack into a cell whose data has been changed after video recording. Then, the boundary positions of video object units VOBU in the cell match those of ECC blocks (32 kbytes) which form data in that cell.

As a result, upon rewriting data later, data can be overwritten in units of ECC blocks (ECC need not be re-encoded). In addition, when the AV address uses an ECC block made up of 16 sectors as a unit, address management is easy even when overwrite (insert edit or the like) is made after video recording. Since this overwrite is made irrespective of VOBU#g who data has not changed, playback of data of VOBU#g never fails due to rewrite of the data change area.

When each VOBU size matches an integer multiple of 32 kbytes before and after data change even when no dummy pack is inserted (an integer multiple of 32 kbytes also means that of 2 kbytes of a sector), no dummy pack need be added for the purpose of the 32-kbyte align. However, since the dummy pack can be used in addition to 32-kbyte align (e.g., as an auxiliary area for postrecording and the like), an appropriate number of dummy packs are preferably inserted irrespective of 32-kbyte align.

Figures 13, 14:
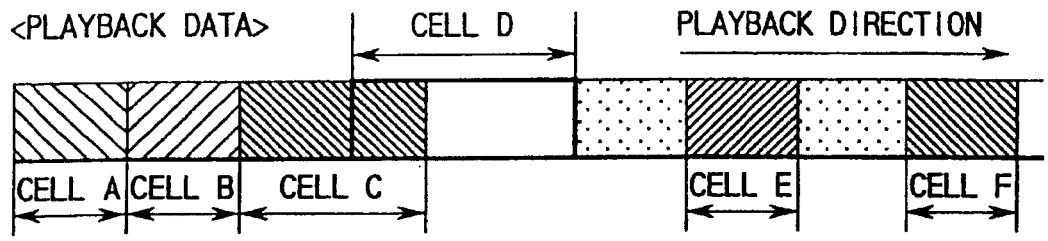
FIG. 13 is a view for explaining a case upon playing back cell data recorded on the disc shown in FIG. 1.
FIG. 14 is a table for explaining an example of the relationship between cells that form playback data shown in FIG. 13 and program chain information.

FIG. 13 shows an example of playback of cell data recorded on disc 10 shown in FIG. 1.

As shown in FIG. 13, playback data is designated by a playback period from cell A to cell F. A playback combination of these cells in each program chain (PGC) is defined by program chain information.

FIG. 14 is a table for explaining an example of the relationship between cells that form playback data shown in FIG. 13, and program chain information (PGCI) (see FIG. 5).

More specifically, PGC#1 comprised of three cells #1 to #3 designates cell playback in the order of cell A→cell B→cell C. PGC #2 comprised of three cells #1 to #3 designates cell playback in the order of cell D→cell E→cell F. Furthermore, PGC#3 comprised of five cells #1 to #5 designates cell playback in the order of cell E→cell A→cell D→cell B→cell E.

In FIGS. 13 and 14, PGC#1 exemplifies a continuous playback period from cell A to cell C, and PGC#2 exemplifies an intermittent playback period from cell D to cell F. On the other hand, PGC#3 shows an example that allows discontinuous cell playback independently of the cell playback direction and repetitive playback (cells C and D).

<Method of Assuring Continuous Playback Condition>

An indispensable condition for video information is to guarantee continuity upon playback unlike conventional computer information. As information for guaranteeing continuous playback, neither a special flag nor a statement are required. Information that guarantees continuity upon playback can be recorded in PGC control information PGCCI shown in FIG. 4. More specifically, "information that guarantees continuity upon playback" can be inserted in the form of adding a predetermined condition to a PGC coupling method that couples cells. Insertion of the predetermined condition will be explained below.

Figure 15:
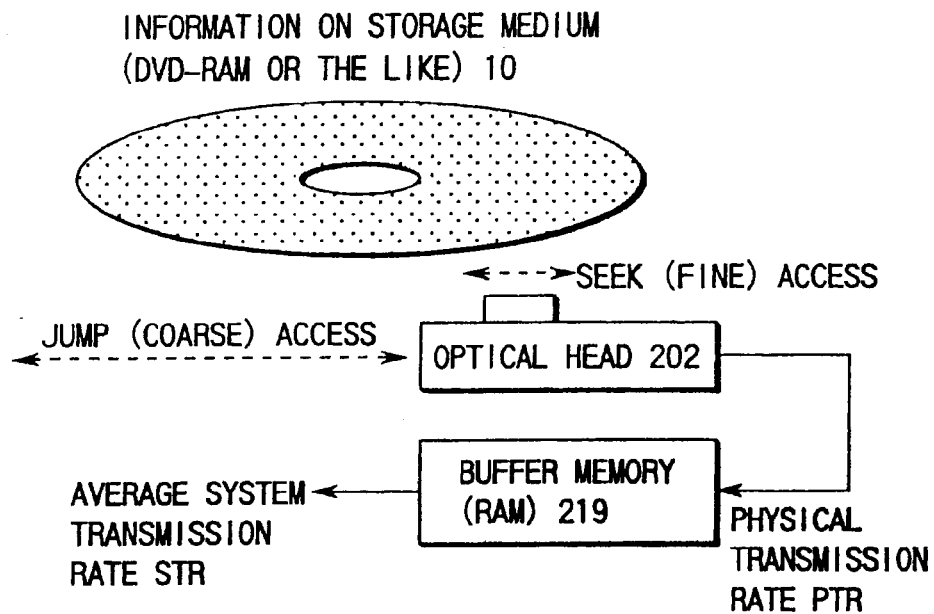
FIG. 15 is a schematic view of a playback system for explaining continuity of a playback signal.

FIG. 15 is a schematic view of a playback system to explain continuity of a playback signal.

Video information recorded on information storage medium 10 is read by optical head 202, and is temporarily saved in buffer memory (semiconductor memory) 219. The video information read out from this buffer memory 219 is sent externally. The transmission rate of the video information sent from optical head 202 to buffer 219 will be referred to as a physical transmission rate (PTR) hereinafter. Also, the average value of the transmission rate of the video information externally transferred from buffer memory 219 is named a system transmission rate (STR). In general, physical and system transmission rates PTR and STR assume different values.

In order to play back information recorded at different locations on information storage medium 10 in turn, access operation for moving the focused spot position of optical head 202 is required. Seek access for moving entire optical head 202 is made to attain large movement; jump access for moving only an objective lens (not shown) for focusing laser is made to attain a movement for a very small distance.

Figure 16:
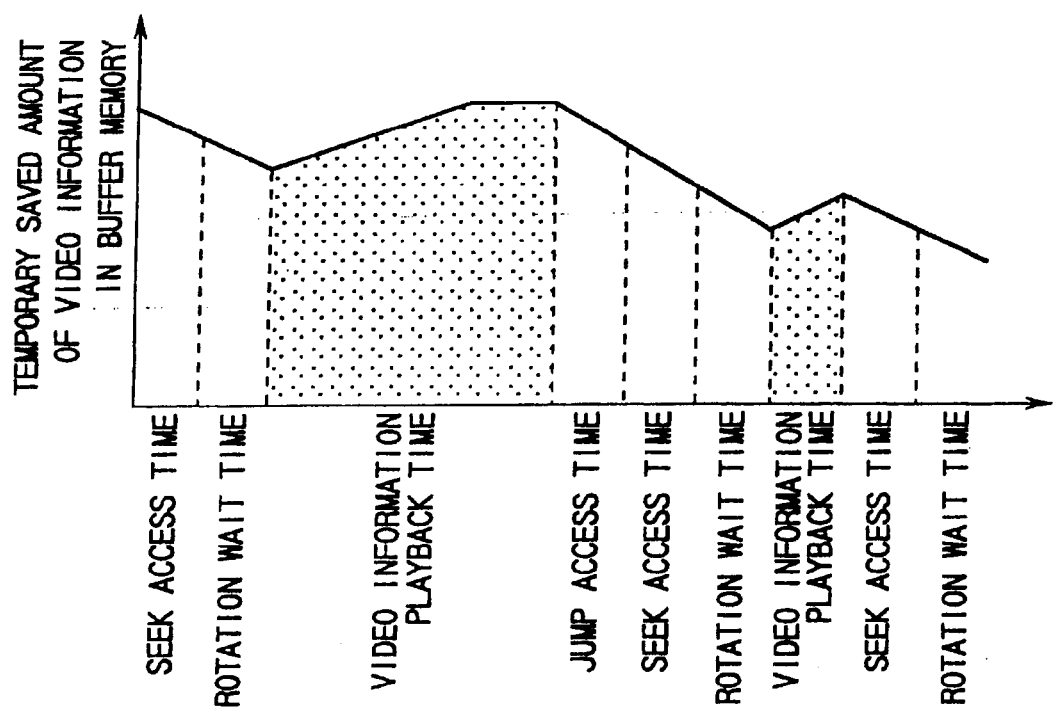
FIG. 16 is a graph for explaining an example of the relationship between the access operations and the like and the temporary storage amount in a buffer memory upon continuously playing back a video signal.

FIG. 16 shows a change over time in video information amount temporarily saved in buffer memory 219 upon externally transferring video information while making access control.

In general, since system transmission rate STR is higher than physical transmission rate PTR, the video information amount temporarily saved in buffer memory 219 continues to increase during the period of a video information time. When the temporarily saved video information amount has reached the capacity of buffer memory 219, a playback process by optical head 202 is intermittently done, and the video information amount temporarily saved in buffer memory 219 maintains the buffer memory capacity full state (corresponding to a flat top of the graph in the video information playback time in FIG. 16).

When video information recorded at another location on information storage medium 10 is to be played back successively, an access process of optical head 202 is executed.

Three different access periods of optical head 202, i.e., a seek access time, a jump access time, and a rotation wait time of information storage medium 10, are required, as shown in FIG. 16. In these periods, since no information is played back from information storage medium 10, physical transmission rate PTR during these periods is substantially "0". By contrast, since average system transmission rate of video information to be externally sent remains constant, the video information temporary saved amount in buffer memory 219 keeps on decreasing (a graph that declines to the right during the seek access time, jump access time, or rotation wait time in FIG. 16).

Upon completion of access of optical head 202, when playback from information storage medium 10 restarts (smaller one of the hatched video information playback times in FIG. 16), the video information temporary saved amount in buffer memory 219 increases again.

This increase slope is determined by the difference between the physical transmission rate and average system transmission rate, i.e., (physical transmission rate PTR)−(average system transmission rate STR).

After that, when access is made again near the playback position on information storage medium 10, since it can be attained by only jump access, only the jump access time and rotation wait time are required (a graph that declines to the right in FIG. 16).

A condition that allows continuous playback in the playback operation shown in FIG. 16 can be defined by the "upper limit value of an access count during a specific period". That is, the information contents of PGC control information PGCCI shown in FIG. 4, e.g., a cell combination shown in FIG. 14, are set so that the access count assumes a value equal to or smaller than the "upper limit value of an access count during a specific period".

An access count condition that absolutely disables continuous playback will be explained below using FIG. 17.

When the access frequency is highest, the video information playback time is very short, as shown on the right side of the graph center in FIG. 17, and only the jump access time and rotation wait time successively appear. In such case, it is impossible to assure playback continuity irrespective of physical transmission rate PTR.

Let BM be the size of buffer memory 219. Then, the temporary saved video information in buffer memory 219 is exhausted within a period:

$$BM/STR (=BM \div STR) \tag{01}$$

and continuous playback is disabled.

Let JATi (Jump Access Time of an objective lens) be each jump access time, and MWTi (Spindle Motor Wait Time) be each rotation wait time. Then, in the example shown in FIG. 17, we have:

$$BM/STR = \Sigma(JATi+MWTi) \tag{02}$$

Approximating equation (02), and letting JATa be the average jump access time, MWTa be the average rotation wait time, and n be the access count within the period until the temporary saved video information in buffer memory 219 is exhausted, equation (02) can be rewritten as:

$$BM/STR = n \cdot (JATa + MWTa) \quad (03)$$

In this case, an indispensable condition as "access count n until temporary saved video information in buffer memory 219 is exhausted" which is an absolute condition for assuring continuous playback is:

$$n < BM/(STR \cdot (JATa + MWTa)) \quad (04)$$

The value given by inequality (04) is rewritten to access count N per sec as:

$$N = n/(BM/STR) < 1/(JATa + MWTa) \quad (05)$$

Since average system transmission rate STR when MPEG2 is used is around 4 Mbps (bits per second), and the average rotation cycle of a 2.6-GB DVD-RAM single-sided, single-layered disc is approximately 35 ms (milliseconds), average rotation wait time MWTa is MWTa≈18 ms. On the other hand, a general information recording/playback apparatus has JATa≈5 ms.

As a practical example of size BM of the buffer memory 219, some drives with a larger size have 2 Mbytes=16 Mbits, but the buffer memory sizes of most drives (information recording/playback apparatuses) is around 512 kbytes=4 Mbits in the status quo (in terms of the product cost).

Upon computing using buffer memory size BM=4 Mbits, the shortest time until the temporary saved video information in buffer memory 219 is exhausted is 4 Mbits/4 Mbps≈1 sec. Substituting this value in inequality (04) yields:

$$n < BM/(STR \cdot (JATa + MWTa)) = 1 \text{ sec}/(18 \text{ ms} + 5 \text{ ms}) \approx 43$$

A computation example under the specified condition yields the aforementioned result (access count upper limit n≈43). However, since the computation result changes depending on the buffer memory size and average system transmission rate of the apparatus, equation (03) serves as a condition formula required to assure continuous playback.

When access is made at an access frequency slightly lower than that obtained by equation (03), and when physical transmission rate PTR is much higher than average system transmission rate STR, continuous playback is enabled.

In order to allow continuous playback by satisfying only the condition of equation (03), the following prerequisites must be satisfied:

1) physical transmission rate PTR is extremely high; and
2) all pieces of video information to be accessed are allocated at nearby locations and can be accessed by only jump access without any seek access.

Hence, a condition that can guarantee continuous playback even when physical transmission rate PTR is relatively low will be examined below.

As shown in FIG. 18, when the video information playback time and access times have good balance, and the temporary saved video information in buffer memory 219 is maintained nearly constant from a global point of view, continuity of video information playback viewed from an external system can be assured without exhausting temporary saved video information in buffer memory 219.

Let SATi (Seek Access Time of an objective lens) be each seek access time, SATa be the average seek access time after n accesses, DRTi (Data Read Time) be the playback information read time per access, and DTRa be the average playback information read time after n accesses.

Then, the data amount externally transferred from buffer memory 219 during the total access period of n accesses is given by:

$$STR \times (\Sigma(SATi + JATi + MWTi)) \approx STR \times n \times (SATa + JATa + MWTa) \quad (06)$$

When the value given by equation (06) and the video information amount:

$$(PTR - STR) \times \Sigma DRTi \approx (PTR - STR) \times n \cdot DRTa \quad (07)$$

stored in buffer memory 219 upon playing back video information by n accesses satisfy (PTR−STR)×n·DRTa≧STR×n×(SATa+JATa+MWTa), i.e., $$(PTR - STR) \cdot DRTa \geq STR \cdot (SATa + JATa + MWTa) \quad (08)$$

continuity of playback video viewed from the external system side can be assured.

If N represents the average access count per sec, we have:

$$1 \approx N \cdot (DRTa + SATa + JATa + MWTa) \quad (09)$$

From formulas (08) and (09), since $$1 \approx N \cdot (SATa + JATa + MWTa) + STR/(PTR - STR)$$

solving this inequality for N yields:

$$N \leq 1/\{[1 + STR/(PTR - STR)](SATa + JATa + MWTa)\} \quad (10)$$

N of this inequality (10) defines the access count upper limit value per sec that can assure continuity of playback video.

The relationship between the seek access distance and the seek access time required therefor will be examined below.

Figure 19:
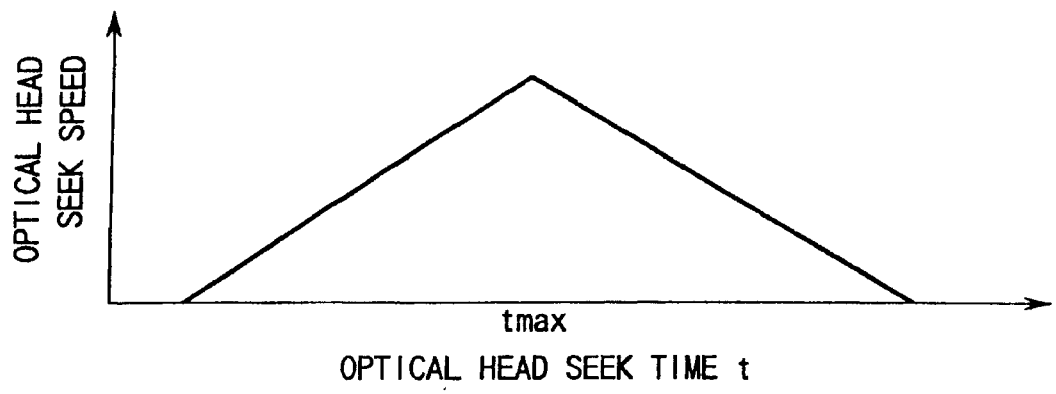
FIG. 19 is a graph for explaining the relationship between the seek distance and seek time of an optical head.

FIG. 19 is a view for explaining the relationship between the seek distance and seek time of an optical head.

When a target position has been reached while accelerating/decelerating at equal acceleration α, the moving distance until time tmax at which the moving speed of optical head 202 becomes maximum is α·tmax·tmax/2 from FIG. 19. Hence, total distance ρ the optical head has moved by seek access is given by:

$$\rho = \alpha \cdot tmax \cdot tmax \quad (11)$$

As can be seen from equation (11), the time required for seek access is proportional to the ½-th power (i.e., a square root) of the moving distance.

Figure 20:
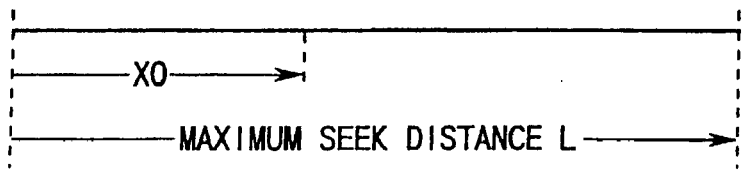
FIG. 20 is a view for explaining the method of obtaining the average seek distance of the optical head.

FIG. 20 is a view for explaining the average seek distance of the optical head.

The average seek distance (average seek access distance) upon recording video information on an area having radial width L will be examined. As shown in FIG. 20, the average seek distance from a position distance X0 from the end (of a seek area) to all recording areas is given by:

$$X0X0/2L + (L - X0) \cdot (L - X0)/2L \quad (12)$$

When the average value upon moving X0 from 0 to L is computed using formula (12), the average seek distance as a result of integrating X0 under prescribed conditions is:

$$L/3 \quad (13)$$

A case will be examined below wherein an area corresponding to half the radial width on optical disc 10 which corresponds to data area DA shown in FIG. 4 is used to record AV data area DA2.

In this case, from formula (13) the average seek distance (average seek access distance) is ⅙ the radial width on optical disc 10 corresponding to data area DA.

For example, when optical head 202 takes 0.5 sec to move (seek) from the innermost periphery to the outermost periphery of the recording area (data area DA in FIG. 4), from equation (11) the average seek time (average seek access time) within AV data area DA2 is:

$$SATa \approx 200 \text{ ms} \qquad (14)$$

which is a value proportional to the ½-th power of ⅙ of 0.5 sec.

For example, MWTa≈18 ms and JATa≈5 ms are used in computations, as described above. In such case, a 2.6-GB DVD-RAM disc has PTR=11.08 Mbps. When the average transmission rate of MPEG2 is STR 4 Mbps, if the aforementioned values are substituted in inequality (10), N is obtained.

Figure 21:
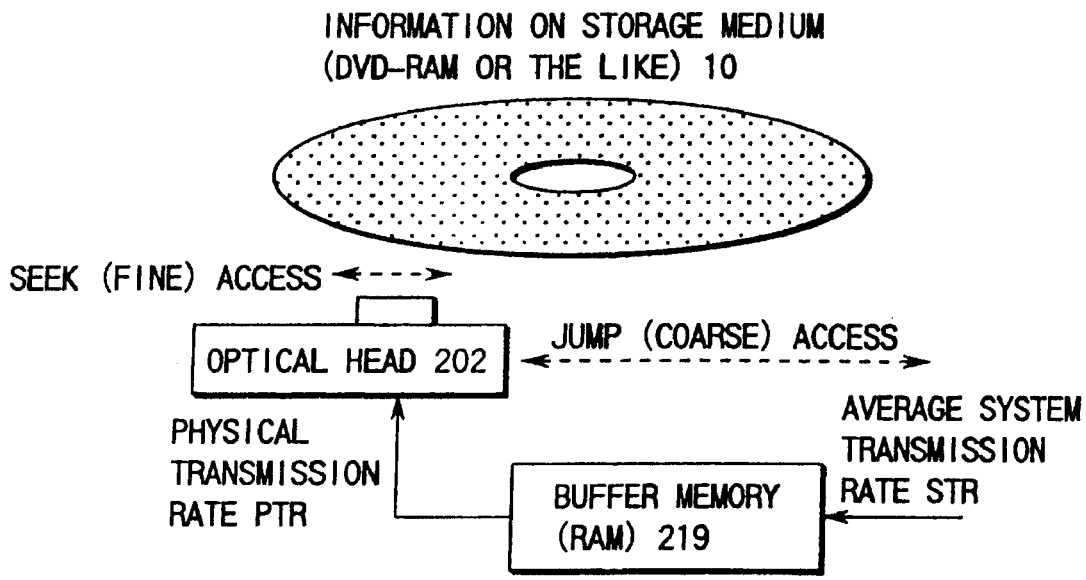
FIG. 21 is a schematic view of a recording system for explaining continuity of a recording signal.

FIG. 21 is a schematic view of a recording system to explain continuity of a recording signal.

Recording information is externally sent to buffer memory 219 at average system transmission rate STR (around 4 Mbps in MPEG2 video). Buffer memory 219 temporarily holds the sent information (MPEG video data and the like), and transfers the held information to optical head 202 at physical transmission rate PRT that matches the storage medium and the type of drive.

In order to record the information at different locations on information storage medium 10 in turn, access operation that moves the focused spot position of optical head 202 is required. Seek access for moving entire optical head 202 is made to attain large movement; jump access for moving only an objective lens (not shown) for focusing laser is made to attain a movement for a very small distance.

<Access Frequency Reduction Method; Re-Arrange Cells by Editing>

FIG. 22 exemplifies cells that form a portion of recorded AV data (video signal information), and video object unit VOBU sequences of the respective cells.

FIG. 23 is a view for explaining a case wherein cell #2 is edited and data falls short in the middle of cell #2 (at the position of VOBU 108e) in the sequence shown in FIG. 22 (VOBU 108e is re-encoded).

Furthermore, FIG. 24 is a view for explaining changes in cell configuration, VOBU sequences, and position of a free area exemplified in FIG. 22 upon completion of edit in FIG. 23.

In order to guarantee the seamless, continuous playback or recording, each cell layout in PGC information (FIGS. 10 and 14) in PGC control information PGCCI in FIG. 4 is set to satisfy the condition of formula (5) or (10). However, when the access frequency becomes higher than a seamless guarantee value due to user requests in the edit operation, the access frequency reduction process is executed again to satisfy the conditions of formulas (03) or (08).

This re-process will be explained below.

Assume that the cell playback order:

cell #1→cell #2→cell #3 is initially set, as shown in FIG. 22 (in this case, no access occurs during playback).

Then, the user divides cell #2 into cell #2A and cell #2B (FIG. 23), and sets the cell playback order:

cell #2A→cell #1→cell #2B→cell #3

In this case, the access count increases by two, that is:
access from the end of cell #2A to the head of cell #1; and
access from the end of cell #1 to the head of cell #2B.

In this manner, when formula (03) or (08) cannot be satisfied as a result of an increase in access count in that PGC, cell #2A is moved to free area 107, as shown in FIG. 24.

As a result, the access count in the PGC that defines the playback order "cell #2A→cell #1→cell #2B→cell #3" decreases to one, that is:

access from the end of cell #1 to the head of cell #2B.

As in the above example, when formula (03) or (08) cannot be satisfied, some cells are moved (to change the recording location on information storage medium 10), thus lowering the access frequency. In this way, formula (03) or (08) is satisfied to guarantee seamless, continuous playback or recording in that PGC.

When formula (03) or (08) is not satisfied even after an increase in access count due to editing is decreased by the aforementioned method, the user re-checks the cell configuration of the PGC to re-configure the number and sequence (layout) of cells in the PGC so as to satisfy formula (03) or (08).

<Method of Assuring Continuous Recording Condition>

Figure 25:
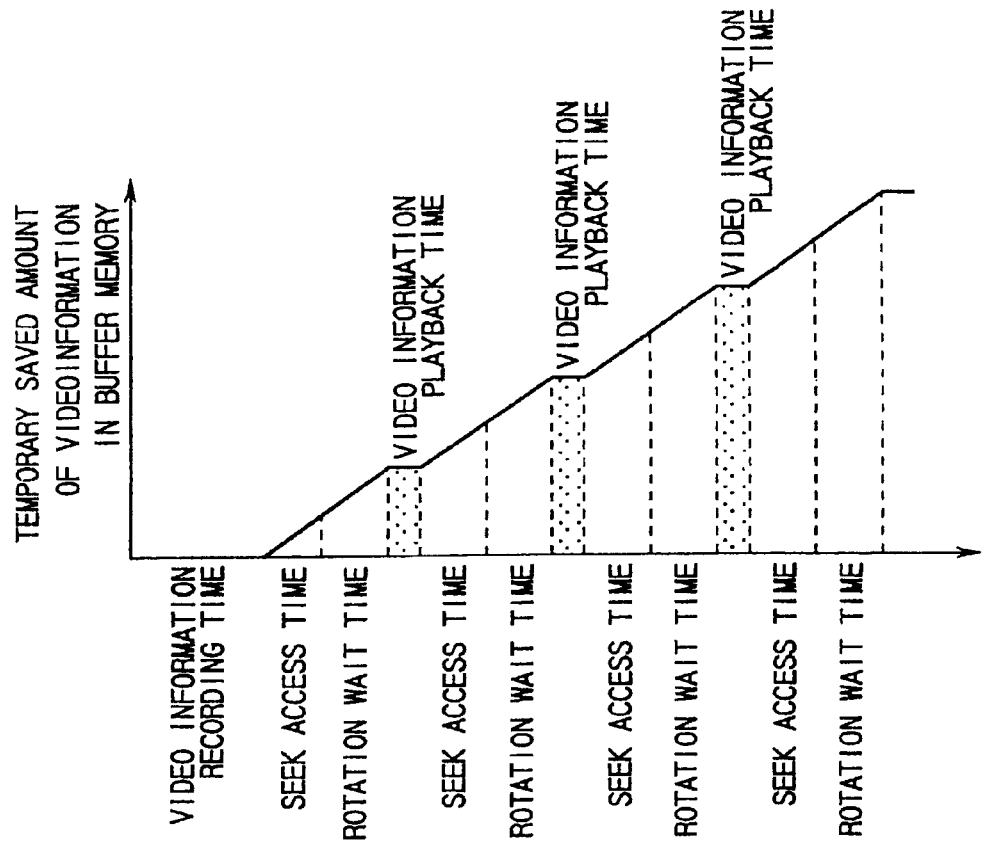
FIG. 25 is a graph for explaining an example (highest access frequency) of the relationship between the access operations and the like and the temporary storage amount in a buffer memory upon continuously playing back a video signal.
Figure 26:
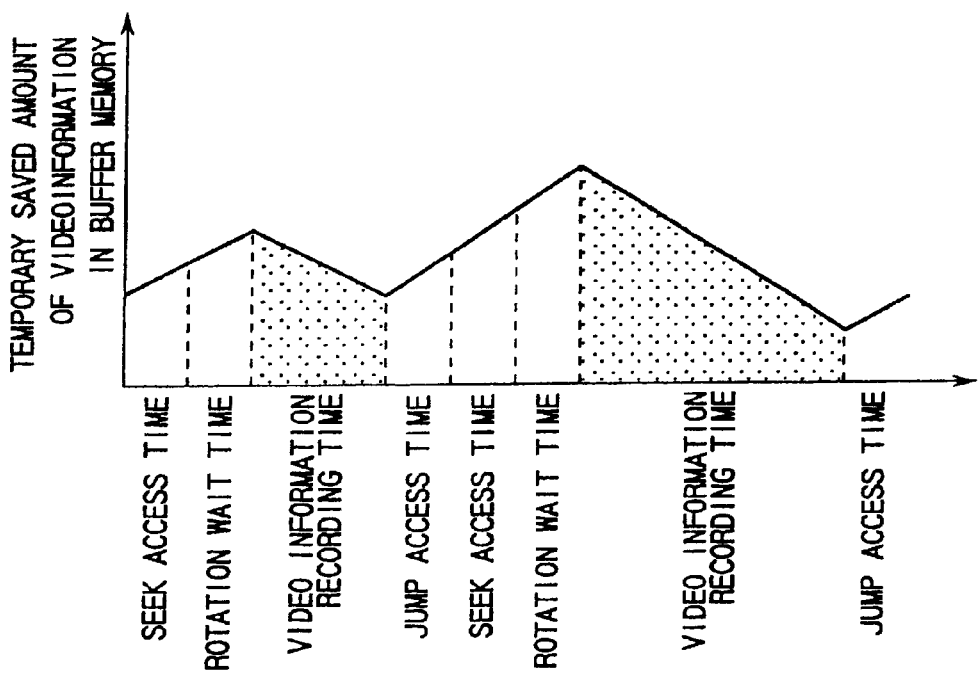
FIG. 26 is a graph for explaining still another example (the playback time balances with the access time) of the relationship between the access operations and the like and the temporary storage amount in a buffer memory upon continuously playing back a video signal.

FIG. 25 is a graph for explaining an example of the relationship between access operations and the temporary saved amount in the buffer memory upon continuous recording of a video signal (when the access frequency is highest). FIG. 26 is a graph for explaining another example of the relationship between access operations and the temporary saved amount in the buffer memory upon continuous recording of a video signal (when the recording time and access time have good balance).

Unlike in the "case wherein continuous playback is disabled when the temporary saved video information amount on buffer memory 219 is exhausted" that has been explained with reference to FIG. 17, the temporary saved video information amount on buffer memory 219 is saturated upon continuous recording, as shown in FIG. 25.

More specifically, as can be seen from a comparison between FIGS. 25 and 17, formula (03) can be applied to the access frequency that satisfies the continuous recording condition.

Likewise, as can be seen from a comparison between FIGS. 26 and 18, formula (08) can be applied to the access frequency that satisfies the continuous recording condition.

According to the "conditional formula for assuring continuity" that has been explained with reference to FIGS. 16 to 20 and FIGS. 25 and 26, seamless, continuous playback or recording (free from any interrupt during playback or recording) can be guaranteed irrespective of the characteristics of an information recording/playback apparatus (drive) used.

Figure 27:
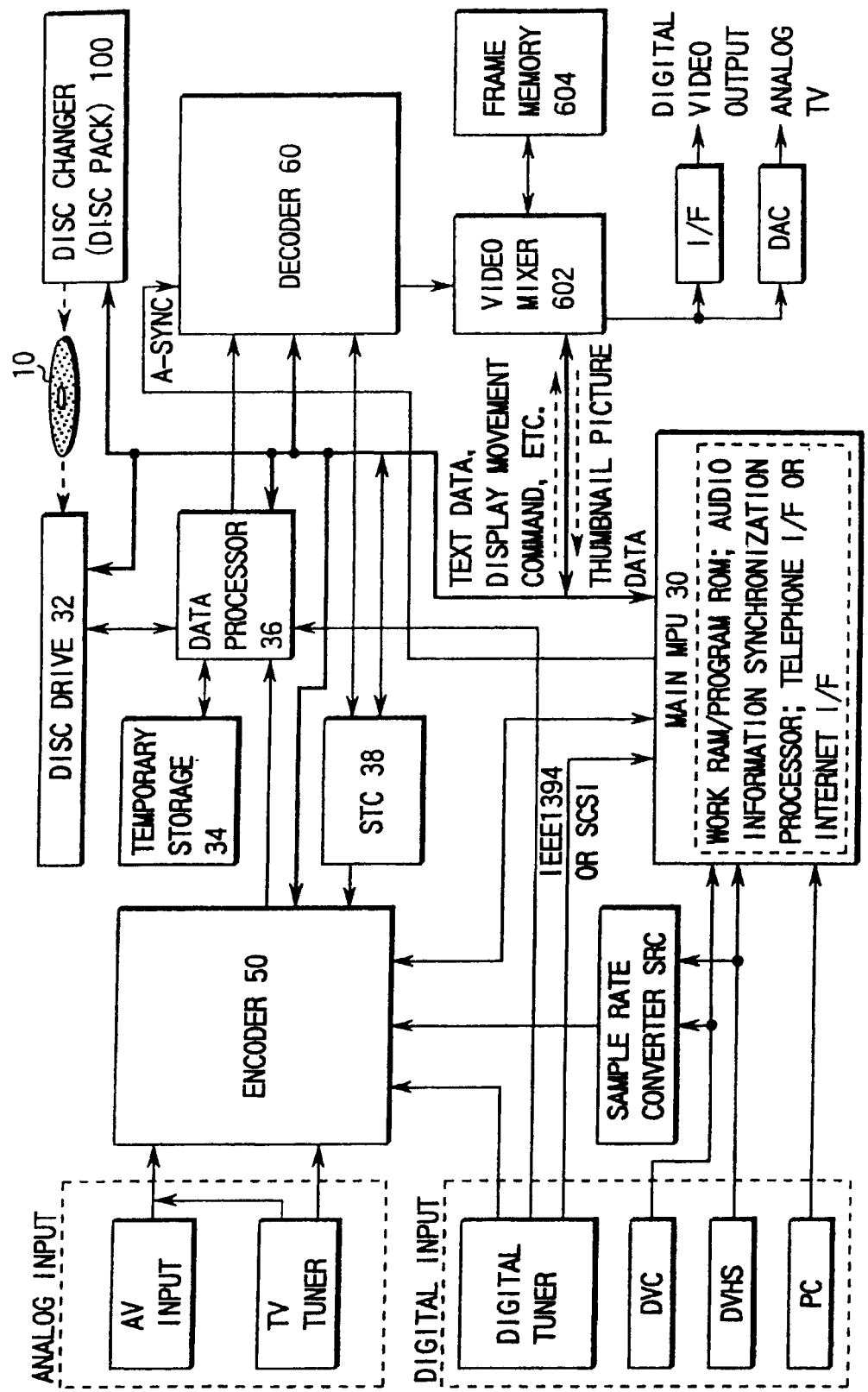
FIG. 27 is a block diagram for explaining the arrangement of a DVD video recorder which can cope with a synchronization error between video and audio upon re-arranging (e.g., editing) video information in a video object.

FIG. 27 is a block diagram for explaining the arrangement of a DVD video recorder which can cope with a synchronization error between video and audio upon re-arranging (e.g., editing) video information in a video object.

The apparatus main body of the DVD video recorder shown in FIG. 27 is roughly constructed by disc drive 32 for rotating DVD-RAM (DVD-RW) disc 10, and reading/writing information to/from disc 10, disc changer (or disc pack) 100 which automatically supplies predetermined disc 10 to disc drive 32, and can load a plurality of discs 10, encoder 50 on the video recording side, decoder 60 on the playback side, and main MPU 30 for controlling the operations of the apparatus main body.

Data processor 36 can have functions of supplying DVD recording data output from encoder 50 to disc drive 32, receiving a DVD playback signal played back from disc 10 via drive 32, rewriting management information recorded on disc 10, and erasing data recorded on disc 10, under the control of main MPU 30.

Also, data processor 36 forms ECC groups by combining packs sent from formatter 56 in units of 16 packs, appends error correction information to each ECC group, and sends these ECC groups to disc drive 32. In this case, when disc drive 32 is not ready to record on disc 10, ECC group data appended with error correction information are transferred to temporary storage 34, and are temporarily stored therein until drive 32 is ready to record. When disc drive 32 is ready to record, recording of data stored in temporary storage 34 on disc 10 starts.

Main MPU 30 includes a ROM written with control programs and the like, a RAM that provides a work area required for executing a program, an audio information synchronization processor, a telephone I/F or Internet I/F, and the like.

Figure 29:
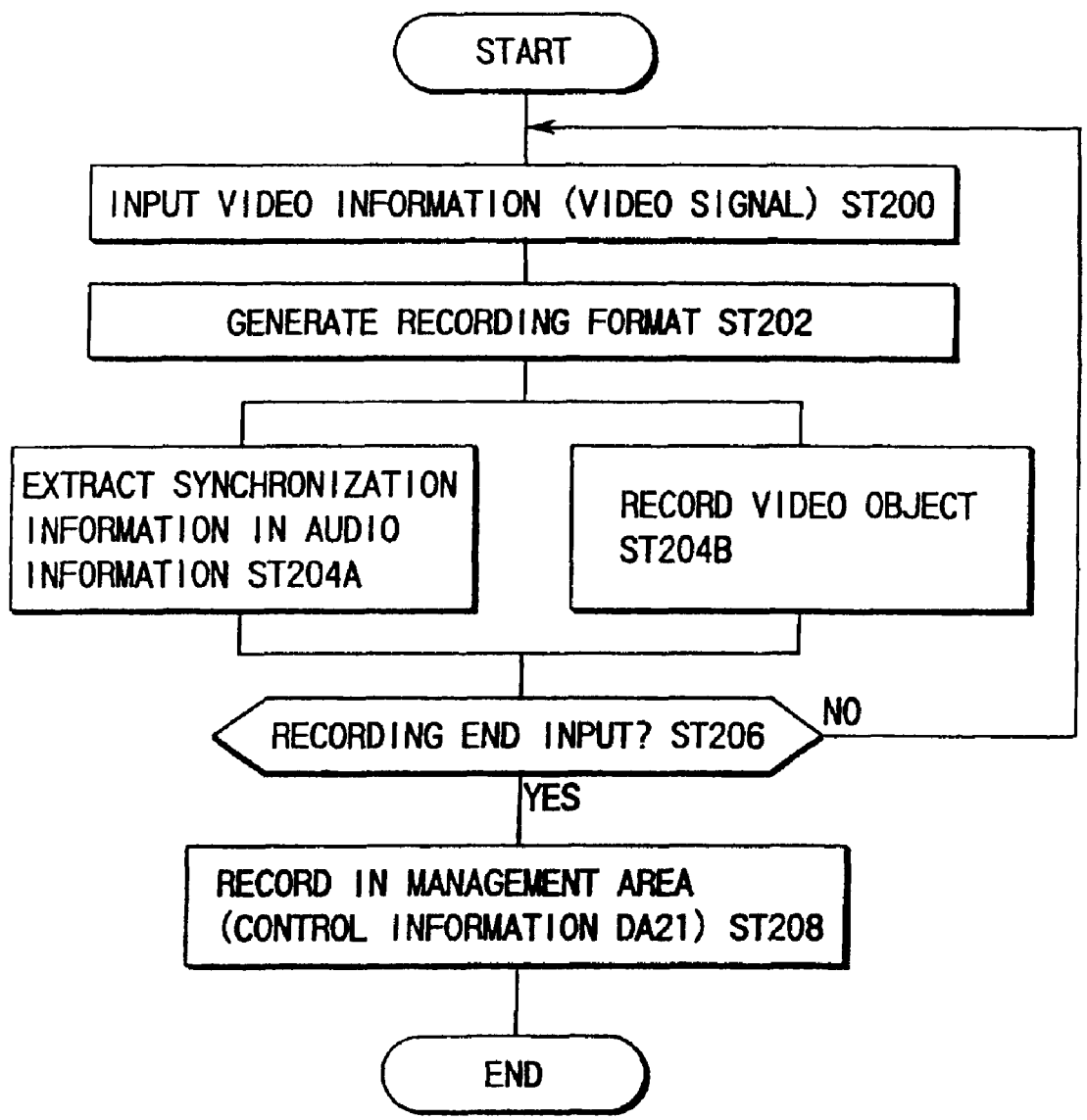
FIG. 29 is a flow chart for explaining the synchronization process between video and audio in the DVD video recorder shown in FIG. 27.

MPU 30 executes an audio information synchronization process (to be described later; FIG. 29) and other processes using its RAM as a work area in accordance with the control programs stored in its ROM.

Of the execution results of main MPU 30, the contents that the DVD video recorder user is informed of are displayed on a display unit (not shown) of the DVD video recorder, or are displayed on a monitor display (not shown) in an on-screen display (OSD) mode.

The information recording/playback apparatus portion that writes/reads (records and/or plays back) information to/from DVD disc 10 comprises disc changer (disc pack) 100, disc drive 32, temporary storage 34, data processor 36, and system time counter (or system time clock; STC) 38.

Temporary storage 34 is used to buffer a predetermined amount of data of those to be written in disc 10 via disc drive 32 (i.e., data output from encoder 50), and to buffer a predetermined amount of data of those played back from disc 10 via disc drive 32 (i.e., data input to decoder 60). In this sense, temporary storage 34 in FIG. 27 has a function corresponding to buffer memory 219 in FIG. 21.

For example, when temporary storage 34 is comprised of a semiconductor memory (DRAM) of 4 to 8 Mbytes, it can buffer recording or playback data for approximately 8 to 16 sec at an average recording rate of 4 Mbps. On the other hand, when temporary storage 34 is comprised of a 16-Mbyte EEPROM (flash memory), it can buffer recording or playback data for approximately 32 sec at an average recording rate of 4 Mbps. Furthermore, when temporary storage 34 is comprised of a 100-Mbyte very compact HDD (hard disc), it can buffer recording or playback data for 3 min or more at an average recording rate of 4 Mbps.

When the DVD video recorder has an external card slot (not shown in FIG. 27), the EEPROM may be sold as an optional IC card. On the other hand, when the DVD video recorder has an external drive slot or SCSI interface, the HDD can be sold as an optional expansion drive.

In this connection, in an embodiment (not shown) in which a DVD video recorder is implemented by software using personal computer PC, the free space of a hard disc drive or a main memory of PC itself can be partially used as temporary storage 34 in FIG. 27.

Temporary storage 34 can also be used to temporarily store recording information until disc 10 is exchanged by a new one, when disc 10 has been fully recorded during video recording, in addition to the aforementioned purpose of guaranteeing "seamless, continuous playback or recording".

Furthermore, when disc drive 32 uses a high-speed drive (double-speed or higher), temporary storage 34 can be used to temporarily store data that excesses data to be read out from a normal drive within a predetermined period of time.

When read data upon playback is buffered on temporary storage 34, even when an optical pickup (not shown) produces read errors due to a vibration shock or the like, playback data buffered on temporary storage 34 can be used instead, thus preventing the played back picture from being interrupted.

As an analog signal source of a raw signal to be recorded on disc 10, a video playback signal of VHS video, laser disc LD, or the like is available, and this analog video signal is input to encoder 50 via an AV input shown in FIG. 27.

As another analog signal source, normal analog TV broadcast (ground or satellite broadcast) is available, and this analog TV signal is input to encoder 50 from a TV tuner shown in FIG. 27 (in case of TV, text information such as closed caption or the like is often broadcasted simultaneously with video information, and such text information is also input to encoder 50).

As a digital signal source of a raw signal to be recorded on disc 10, a digital output or the like of a digital broadcast tuner is available, and this digital video signal is directly input to encoder 50.

When this digital tuner has an IEEE1394 interface or SCSI interface, its signal line is connected to main MPU 30.

When a bitstream (including MPEG-encoded video) of DVD video is digitally broadcasted directly, and the digital tuner has a digital output of the bitstream, since the bitstream output has already been encoded, it is directly transferred to data processor 36.

Note that the analog video output of a digital device which does not have any digital video output but has digital audio output (e.g., digital video cassette DVC or digital VHS video DVHS) is connected to the Av input, and its digital audio output is supplied to encoder 50 via sample rate converter SRC. This SRC converts a digital audio signal having a sampling frequency of, e.g., 44.1 kHz into that having a sampling frequency of 48 kHz.

Although no signal lines are illustrated in FIG. 27, when personal computer PC can output a digital video signal in the DVD video format, that digital video signal can be directly input to encoder 50.

All digital input audio signal sources (digital tuner, DVC, DVHS, PC, and the like) are connected to main MPU 30. This is done to use such signals in the "audio synchronization process" to be described later.

The control timings that main MPU 30 controls disc changer (disc pack) 100, disc drive 32, data processor 36, and encoder 50 and/or decoder 60 can be determined based on time data output from STC 38 (video recording/playback operations are normally done in synchronism with time clocks from STC 38, but other processes may be executed at timings independently of STC 38).

A DVD digital playback signal which is played back from disc 10 via disc drive 32 is input to decoder 60 via data processor 36.

As will be described in detail later using FIG. 28, decoder 60 includes a video decoder for decoding a main picture video signal from the input DVD digital playback signal, a sub-picture decoder for playing back a sub-picture signal from this playback signal, an audio decoder for playing back an audio signal from this playback signal, a video processor for compositing the decoded sub-picture on the decoded main picture, and a means (reference clock generator) for correcting timing errors between video and audio signals or among channels of a multi-channel audio signal.

A video signal (main picture+sub-picture) decoded by decoder 60 is supplied to video mixer 602. Video mixer 602 receives reduced-scale picture/thumbnail picture data (see FIG. 4) and text data from main MPU 30 as needed. This thumbnail picture (and/or text) are/is composited on the decoded video signal on frame memory 604 to generate a visual menu (user menu) used in a recorded content search and the like.

When thumbnail pictures for the user menu are displayed on a monitor (not shown), a thumbnail picture file previously saved as an independent file is flowed as stream packs, and is displayed by designating display positions (X- and Y-coordinate values) in frame memory 604. At this time, if text data or the like is included, text is displayed below each thumbnail picture using a character ROM (or kanji ROM).

A digital video signal including this visual menu (user menu) as needed is output outside the apparatus shown in FIG. 27 via a digital video I/F. Also, the digital video signal including the visual menu as needed is converted into an analog video signal via a video DAC, and the analog video signal is sent to an external analog monitor (a TV with an AV input).

Note that thumbnail picture data for the user menu may be inserted into recording data as independent video pack data in place of the aforementioned independent file. That is, the DVD video format specifies "0" (stream ID=0E0h) as a stream number for main picture data, and can also specify "1" (stream ID=0E1h) as that for thumbnail picture data and multiplex such stream. The multiplexed thumbnail pictures with the stream number="1" serve as source data used in a menu edit process.

Figure 28:
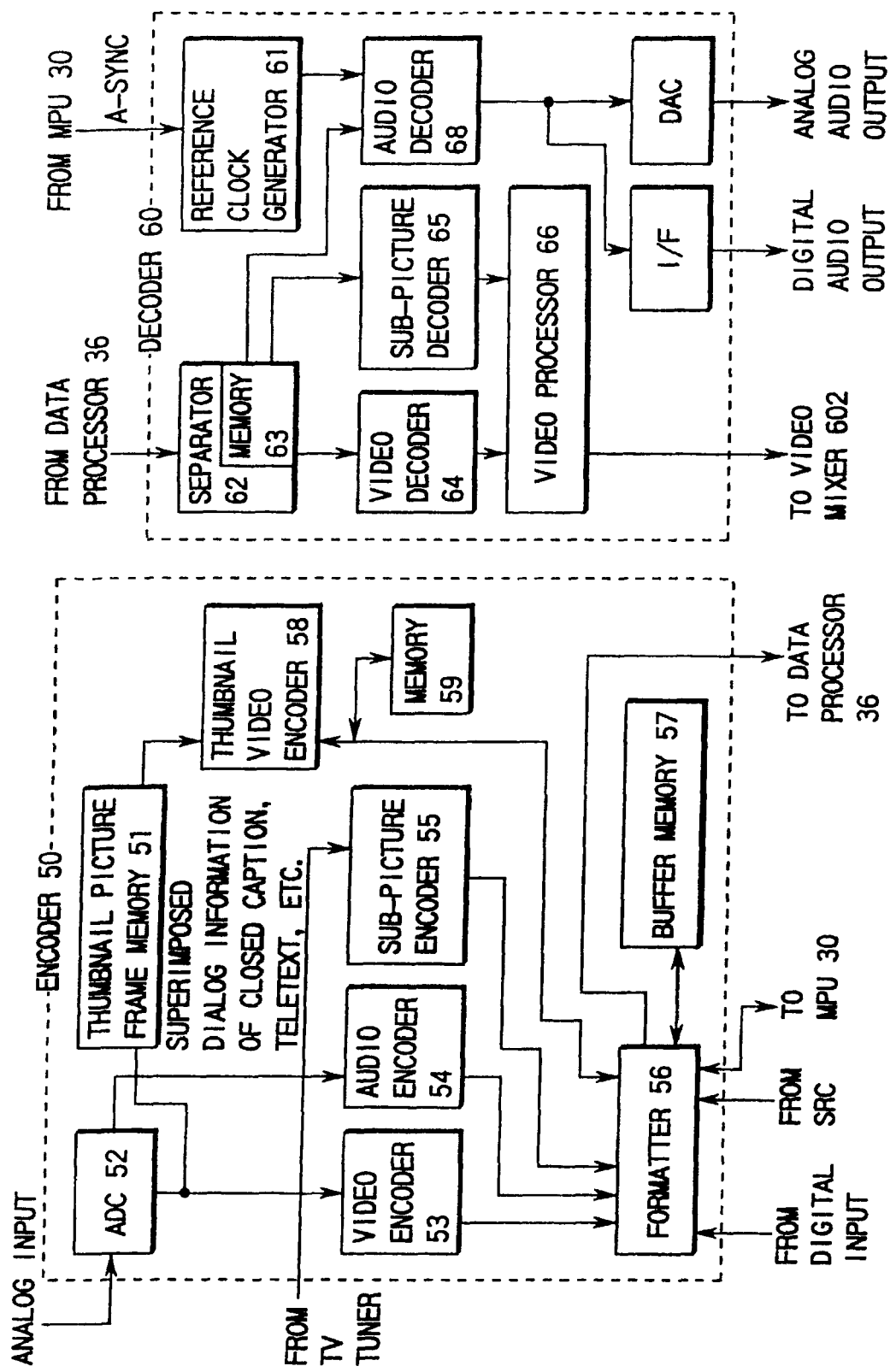
FIG. 28 is a block diagram showing the internal arrangement of an encoder and decoder in the arrangement shown in FIG. 27.

FIG. 28 is a block diagram for explaining the internal arrangement of the encoder and decoder in the arrangement shown in FIG. 27.

Encoder 50 comprises ADC (analog-to-digital converter) 52, video encoder 53, audio encoder 54, sub-picture encoder 55, formatter 56, buffer memory 57, frame memory 51 for thumbnail pictures, thumbnail video encoder 58, and memory 59 used upon encoding thumbnail pictures.

ADC 52 receives an external analog video signal+external analog audio signal from the AV input in FIG. 27, or an analog TV signal+analog audio signal from the TV tuner. ADC 52 converts the input analog video signal into a digital signal at a sampling frequency of, e.g., 13.5 MHz/6.75 MHz and 8 quantization bits.

That is, luminance component Y is converted into digital data at a sampling frequency of 13.5 MHz and 8 quantization bits, and color difference components Cr (or Y–R) and Cb (or Y–B) are respectively converted into digital data at a sampling frequency of 6.75 MHz and 8 quantization bits.

Similarly, ADC 52 converts the input analog audio signal into a digital signal at a sampling frequency of, e.g., 48 kHz and 16 quantization bits.

When an analog video signal and digital audio signal are input to ADC 52, the digital audio signal passes through ADC 52. (The digital audio signal may undergo processes for reducing jitter alone, changing the sampling rate or the number of quantization bits, and the like without changing its contents.)

On the other hand, when a digital video signal and digital audio signal are input to ADC 52, these signals pass through ADC 52 (these signals may also undergo a jitter reduction, sampling rate change process, and the like without changing their contents).

A digital video signal component output from ADC 52 is supplied to formatter 56 via video encoder 53. Also, a digital audio signal component output from ADC 52 is supplied to formatter 56 via audio encoder 54.

Video encoder 53 has a function of converting the input digital video signal into a digital signal compressed at a variable bit rate by MPEG2 or MPEG1.

Audio encoder 54 has a function of converting the input digital audio signal into a digital signal compressed at a fixed bit rate (or linear PCM digital signal) by MPEG or AC-3.

When a DVD video signal is input from the AV input or when a DVD video signal (digital bitstream) is broadcasted and received by TV tuner 44, a sub-picture signal component (sub-picture pack) in the DVD video signal is sent to sub-picture encoder 55. Alternatively, if a DVD video player with a sub-picture signal independent output terminal is available, a sub-picture signal component can be extracted from that sub-picture output terminal. Sub-picture data input to sub-picture encoder 55 is arranged into a predetermined signal format, and is then supplied to formatter 56.

Formatter 56 performs predetermined signal processes for the input video signal, audio signal, sub-picture signal, and the like while using buffer memory 57 as a work area, and outputs recording data that matches a predetermined format (file structure) to data processor 36.

The respective encoders (53 to 55) compress and packetize the input signals (video, audio, and sub-picture). (Note that packets are segmented and packetized to have a size of 2,048 bytes per pack.) These compressed signals are input to formatter 56. Formatter 56 determines and records presentation time stamp PTS and decoding time stamp DTS of each packet in accordance with the timer value from STC 38 as needed.

In this case, packets of thumbnail pictures used in the user menu are transferred to and temporarily saved in memory 59 for storing thumbnail pictures. The thumbnail picture packet data is recorded as an independent file upon completion of video recording. The size of each thumbnail picture on the user menu is selected to be, e.g., approximately 144 pixels×96 pixels.

Note that MPEG2 compression, which is the same as the compression format of main picture data, can be used as that of thumbnail pictures, but other compression schemes may be used. For example, other compression schemes such as JPEG compression, runlength compression (pallet=256 colors: requires a reduction to 256 colors), TIFF format, PICT format, and the like can be used.

Formatter 56 temporarily saves packet data in buffer memory 57, then packs the input packet data to mix them in units of GOPs of MPEG, and transfers the packs to data processor 36.

The contents of standard encoding for generating the recording data to be transferred to data processor 36 will be briefly explained below.

When encoder 50 starts encoding, parameters required for encoding video (main picture) data and audio data are set. The main picture data is pre-encoded using the set parameters to compute an optimal code amount distribution to a predetermined average transmission rate (recording rate). Based on the code amount distribution obtained by pre-encoding, the main picture data is encoded. At this time, the audio data is encoded at the same time.

As a result of pre-encoding, when data compression is insufficient (when a desired video program cannot be stored in a DVD-RAM or DVD-R disc used to record data), if pre-encoding can be done again (for example, if the recording source is the one capable of read many such as a video tape, video disc, or the like), the main picture data is partially re-encoded, and the re-encoded main picture data portion replaces the previously pre-encoded main picture data portion. With a series of such processes, the main picture data and audio data are encoded, and the average bit rate value required for recording is reduced largely.

Likewise, parameters required for encoding the sub-picture data are set, and encoded sub-picture data is generated.

The encoded main picture data, audio data, and sub-picture data are combined and converted into a data structure for video recording.

That is, the configuration of cells that construct program chain PGC shown in FIG. 5 or 14, attributes of main picture, sub-picture, and audio data, and the like are set (some pieces of such attribute information use information obtained upon encoding the individual data), and information management table information containing various kinds of information is created.

The encoded main picture data, audio data, and sub-picture data are segmented into packs each having a predetermined size (2,048 bytes), as shown in FIG. 6. Dummy packs (FIG. 7) are inserted into these packs as needed to implement the aforementioned "32-kbyte align".

Packs other than the dummy packs describe time stamps such as a PTS (presentation time stamp; see FIG. 6), DTS (decoding time stamp), and the like as needed. As for the PTS of sub-picture data, a time arbitrarily delayed from that of main picture data or audio data in the same playback time zone can be described.

The data cells are arranged in units of VOBUs so as to play back data in the order of their time codes, thus formatting a VOBS constructed by a plurality of cells, as shown in FIG. 5, as video object DA22.

When a DVD playback signal is digitally copied from a DVD video player, since the contents of cells, program chain, management tables, time stamps, and the like are predetermined, they need not be generated again. (When a DVD video recorder is designed to digitally copy a DVD playback signal, copyright protection means such as digital watermarking or the like must be taken.)

Decoder 60 in FIG. 28 comprises: reference clock generator 61 for generating sync-locked reference clocks on the basis of audio synchronization signal A-SYNC sent from main MPU 30 in FIG. 27; separator 62 for separating and extracting packs from playback data with the structure shown in FIG. 6; memory 63 used upon signal processes such as pack separation and the like; video decoder 64 for decoding main picture data (the contents of a video pack) separated by separator 62; sub-picture decoder 65 for decoding sub-picture data (the contents of a sub-picture pack) separated by separator 62; video processor 66 for compositing sub-picture data output from sub-picture decoder 65 with video data output from video decoder 64, as needed, and outputting main picture data with superimposed sub-picture data such as menus, highlight buttons, superimposed dialog, and the like; audio decoder 68 for decoding audio data (the contents of an audio pack) separated by separator 62 at the timing of the reference clock from reference clock generator 61; a digital audio I/F for externally outputting a digital audio signal from audio decoder 68; and a DAC for converting the digital audio signal from audio decoder 68 into an analog audio signal, and externally outputting the analog audio signal.

The analog audio signal from this DAC is supplied to external components (not shown; a multichannel stereophonic apparatus having two to six channels).

Note that audio synchronization signal A-SYNC is used to synchronize audio signals in units of, e.g., VOBUs shown in FIG. 6.

Main MPU 30 in FIG. 27 can generate audio synchronization signal A-SYNC by detecting audio synchronization packs, when a digital audio signal sent from a digital input device includes the configuration shown in FIG. 6 and the audio synchronization packs (SNV_PCK; not shown) are inserted at the head positions of respective VOBUs.

Alternatively, main MPU 30 in FIG. 27 can generate audio synchronization signal A-SYNC using PTS information obtained by detecting presentation time stamps PTS (FIG. 6) included in audio packs.

In the arrangement shown in FIGS. 27 and 28, the data processes upon playback are done as follows.

Upon receiving a playback start command by user's operation, main MPU 30 loads the management area of disc 10 from disc drive 32 via data processor 36, and determines the address to be played back (corresponding to the address using common logical sector number LSN).

Main MPU 30 then sends the previously determined address of playback data and a read command to disc drive 32.

An MPU (not shown) in disc drive 32 reads out sector data from disc 10 in accordance with the received command, and data processor 36 makes error correction of the readout data and sends the data to decoder 60 in the form of pack data.

In decoder 60, the readout pack data are packetized. Then, video packet data (MPEG video data) is transferred to video decoder 64, audio packet data to audio decoder 68, and sub-picture packet data to sub-picture decoder 65 in correspondence with the data purposes.

At the beginning of transfer of these packet data, presentation time stamp PTS is loaded to STC 38. After that, the respective decoders in decoder 60 execute playback processes in synchronism with the PTS value in packet data (while comparing PTS and STC values), thus displaying a moving picture with audio and superimposed dialog on a TV monitor (not shown).

By setting the aforementioned AV address, video information in a plurality of DVD-ROM and/or DVD-RAM discs inserted into a multiple disc pack (disc changer 100 in FIG. 27) can be loaded as a part of an AV file.

In a DVD video (DVD-ROM) disc, the recording location of a video object is set by a logical block number (or a logical or physical sector number) as a file entry. In this case, when address conversion table ACT shown in FIG. 4 is used, this logical block number can be converted into the AV address. This address conversion table ACT describes pairs of logical block numbers and AV addresses on a table.

FIG. 29 is a flow chart for explaining a synchronization process between video and audio in the DVD video recorder shown in FIG. 27.

A video signal input from the AV input such as a TV tuner, VTR, camera recorder, or the like is converted into a digital signal by ADC 52 (step ST200).

The converted digital signal is separated into video information and audio information, which are individually encoded by video encoder 53 and audio encoder 54. Closed caption information or information sent as superimposed text of teletext is encoded by sub-picture encoder 55 as sub-picture data. The encoded video information, audio information, and sub-picture information are respectively inserted in video, audio, and sub-picture packs in units of 2,048 bytes by formatter 56, and these packs are arranged in units of VOBUs having a size corresponding to an integer multiple of 32 kbytes, as shown in FIG. 6 (step ST202).

At this time, formatter 56 extracts information indicating "the sample position of the audio information sample position at the I-picture display start time at the head of a VOBU and how many packs this audio pack goes back (or ahead) with reference to the position of a video pack" (step ST204A).

The extracted audio information sample position information is sent to main MPU 30 in FIG. 27.

The audio information synchronization processor in main MPU 30 sends back to formatter 56 a signal for generating presentation time stamp PTS or synchronization navigation pack SNV_PCK (not shown) as a source of audio synchronization signal A-SYNC on the basis of the received audio information sample position information.

Formatter 56 sends VOBU information shown in FIG. 6, which includes the source information (PTS or SNV_PCK) of audio synchronization signal A-SYNC together with the encoded video information, sub-picture information, and audio information, to data processor 36. Parallel to "audio information sample position information extraction step ST204A" which is then repeated, data processor 36 records video object DA22 consisting of VOBU information shown in FIG. 6 at the designated address (AV address) of disc 10 (step ST204B).

As the recording progresses, disc drive 32 returns address information (logical sector number LSN) used in recording to main MPU 30. Main MPU 30 computes the recording location on disc 10 (e.g., the physical sector number PSN position on disc 10 of an audio information sample at the I-picture display start position at the head position of a given recorded VOBU) on the basis of the returned address information and the correspondence between the predetermined and sector. This computation result is used in step ST208 later.

The recording location on disc 10 (the physical sector number PSN position on disc 10 of an audio information sample at the I-picture display start position at the head position of a given VOBU) corresponds to "I-picture audio positions #1, #2, . . . " included in audio synchronization information shown in FIG. 9. That is, the differential address value of an ECC block that includes an audio pack of the same time as the I-picture audio position I-picture start time shown in FIG. 9 is recorded using 1 byte. Of 1 byte, whether the audio sample position is located before or after the head position of a given VOBU is identified using the most significant bit. More specifically, Most significant bit=0: located before VOBU
Most significant bit=1: located after VOBU Recording of video object DA22 on disc 10 proceeds until a recording end input is detected (for example, until the user instructs to stop recording or until the free area of disc 10 is used up) (NO in step ST206; ST200 to ST204A/ST204B).

If the recording end input is detected (YES in step ST206), information that pertains to recording such as the recording end address (physical sector number PSN on disc 10), the recording date/time, and the like is written in the management area (control information DA21) on disc 10 (step ST208). At this time, upon writing information in the management area, control information rewrite count CIRWNs shown in FIG. 4 is incremented by 1.

Note that a value that counts the sample number in an ECC block at the audio sample position of the same time as the I-picture start time using serial numbers of all audio packs is written in the management area (control information DA21) as "I-picture start audio sample numbers #1, #2, . . . " included in the audio synchronization information shown in FIG. 9 (step ST208).

Note that the recording location on disc 10 need not always be expressed by the AV address in units of ECC blocks (16 sectors). The "recording location on disc 10" can also be expressed using the logical block number, logical sector number, or physical sector number as the AV address.

<Edit Process of Cell Including Audio Synchronization Information in FIG. 9>

A case will be examined below wherein cell #2 in information recorded on disc 10 in the order of cell #1, cell #2, and cell #3, as shown in FIG. 22, is divided into cells #2A and #2B, as shown in FIG. 23, cell #2A is moved to free area 91, as shown in FIG. 24, and re-arranged cells are played back in the order of:

cell #2A→cell #1→cell #2B→cell #3

In this case, VOBU 108e is re-encoded, and is divided into VOBUs 108p and 108q. The audio information synchronization processor in main MPU 30 searches for the position of an audio pack included in cell #2A to be moved on the basis of the I-picture audio position (FIG. 9) and I-picture audio sample number (FIG. 9) from disc 10.

If the audio pack included in cell #2 is present in either VOBU 108e or 108q, the corresponding audio pack is extracted therefrom, and is embedded in VOBU 108d* or 108p.

In this case, if that VOBU has an extra dummy pack (having no significant recording data), the audio pack is embedded in such dummy pack. If no such dummy pack is available, re-arrangement of the format and re-encoding in some cases are done.

On the other hand, when cell #2A includes an audio pack used by VOBU 108c or 108f, the corresponding audio pack is copied from cell #2A, and is inserted (embedded) in VOBU 108c or 108f. At this time, the insertion (embedding) result is recorded in the I-picture audio position and I-picture start audio sample number (FIG. 9). A series of operation control processes are mainly executed by the audio information synchronization processor in main MPU 30 in FIG. 27.

A case will be explained below wherein existing audio information from a digital audio information storage medium such as a CD, MD, or the like is overdubbed as background music on video information after playback/editing mentioned above.

A method of overdubbing audio information includes a method of replacing dummy packs in FIGS. 6 and 7 by audio packs, and a method of re-encoding audio information to be overdubbed.

In some cases, the sampling frequency (32 kHz or 44.1 kHz) of audio information is different from that (48 kHz or 96 kHz) of audio information in the recorded video information. Even when the nominal frequency remains the same, the frequency drift (fluctuation of frequency) of a quartz oscillator that generates the reference frequency is normally around ±0.1%. Therefore, when digital audio information is digitally dubbed, recording is done at different reference frequencies. As a consequence, when data is played back at the frequency of originally recorded audio frequency, a synchronization error occurs.

In order to prevent such error, in the present invention, the number of audio samples in units of VOBUs for the digitally dubbed audio information can be recorded as an option in the management area (control information DA21 in FIG. 4).

More specifically, as shown in audio synchronization flags #1, #2, . . . in FIG. 9, a flag indicating whether or not audio synchronization data is recorded is set for each audio stream number, and when the audio synchronization data is to be recorded (flag is set), the number of audio samples of each VOBU is expressed by 2 bytes in the audio synchronization information in FIG. 9.

This audio synchronization information can be recorded as follows.

Audio information to be overdubbed is converted into audio packs in units of 2,048 bytes by formatter 56 in FIG. 28. At this time, the audio information synchronization processor in main MPU 30 in FIG. 27 sends information as to required times in units of VOBUs of the video information of interest. Based on that time information, formatter 56 replies the numbers of audio samples in units of VOBUs to the audio information synchronization processor.

Then, audio packs including the audio information to be overdubbed are replaced by dummy packs, thus completing video object DA22.

After that, based on the numbers of audio samples in units of VOBUs replied from formatter 56 to main MPU 30, the audio information synchronization processor records required information in the audio synchronization information on disc 10.

Upon playback, the audio information synchronization processor in main MPU 30 reads the audio synchronization information on disc 10, and sends the numbers of audio samples in units of VOBUs to reference clock generator 61 in the form of "audio synchronization signal A-SYNC". Reference clock generator 61 generates reference clocks with the frequency adjusted (sync-locked) to that information (A-SYNC), and audio decoder 68 plays back post-inserted audio information (overdubbed audio information) in synchronism with video information in correspondence with the frequency of the generated reference clocks.

In this manner, audio playback free from any synchronization errors from video information can be implemented.

In the above description, the numbers of audio samples are recorded in units of VOBUs. However, the present invention is not limited to this, and the numbers of audio samples may be recorded in units of cells or in units of video frames (or video fields).

According to the aforementioned embodiment, the following effects are obtained:

A) video information can be re-arranged while guaranteeing synchronization of an audio signal;

B) even when digital audio information generated at a sample frequency different from that of an original is recorded in dummy packs or the like by a digital dubbing process after video recording, audio information can be synchronously played back; and C) even when multi-channel audio information of, e.g., AC-3 is re-arranged or mix-down edit from digital sources having different sampling frequencies is done, synchronization among channels can be guaranteed.

In the above description, a DVD-RAM disc has been exemplified as an information storage medium. Alternatively, the system of the present invention (especially, a system that performs address management and replace processes in units of 32-kbyte ECC blocks; or a system that performs address management and replace processes in units of 2-kbyte sectors) can be applied to a system which uses a file allocation table (FAT) for a personal computer in a file system using a magnetooptical disc (MO disc) as an information storage medium.

As system software (or operating system), NTFS (New Technology File System), UNIX, and the like can be used in addition to MS Windows. More specifically, required system software (one or a plurality of kinds of operating systems OS), application software, and the like are recorded as an embossed pattern on ROM layer 17A in a ROM/RAM double-layered disc, the OS and directory information of ROM layer 17A are copied to a main memory of a personal computer in a recording/playback process, and the application software stored in ROM layer 17A can be directly used. In this case, since the application software need not be mapped on the main memory, the main memory space can be broadened. In such personal computer system, RAM layer 17B of identical disc 10 can be used as a large-size storage medium for saving the operation result (edited video and the like) of the application software in ROM layer 17A.

Furthermore, the AV addresses in units of ECC blocks have been explained as the addresses of the AV data structure. Alternatively, the addresses of AV data can be managed using, e.g., addresses in units of 2,048-byte sectors.

Figure 30:
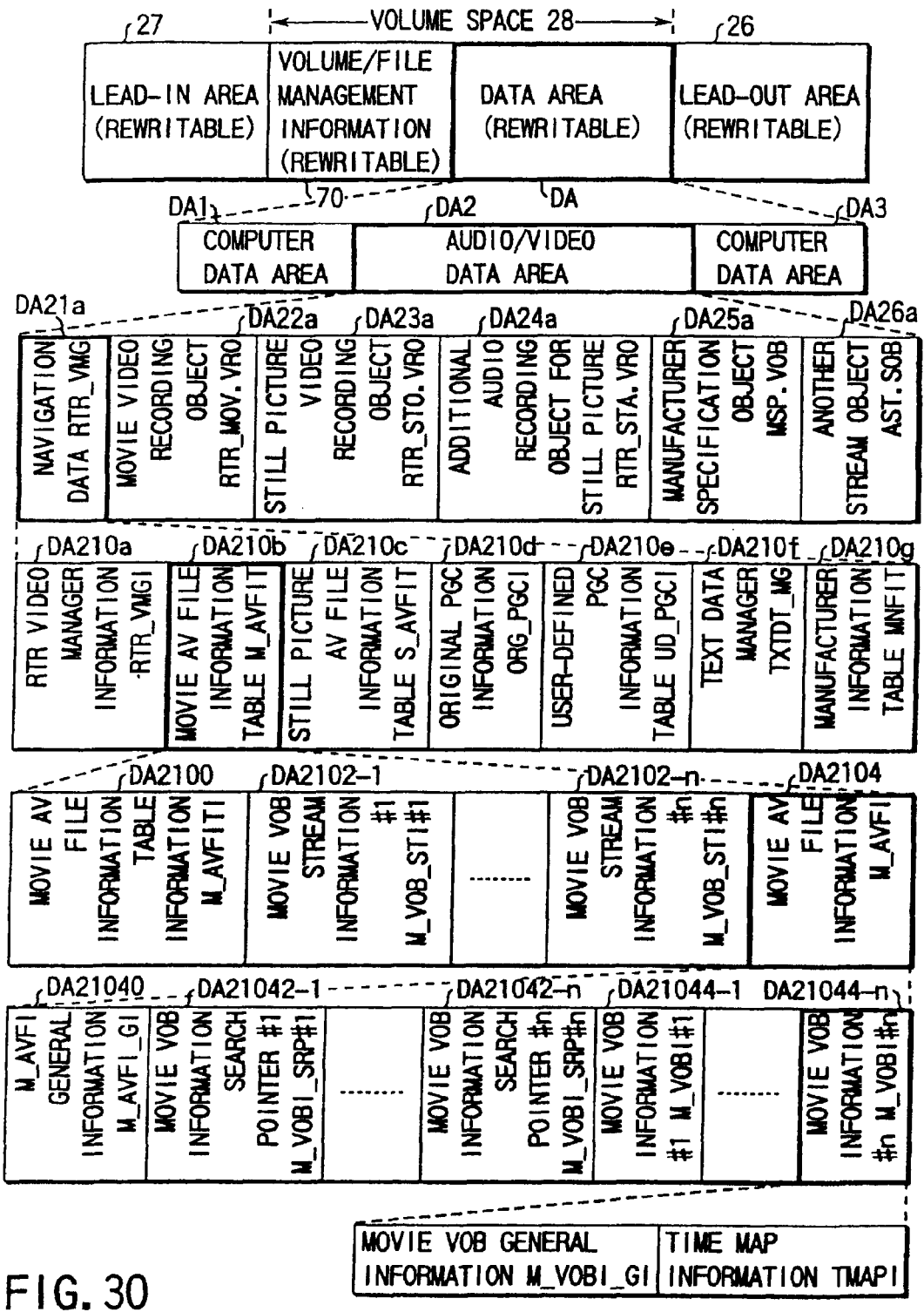
FIG. 30 is a view for explaining another example of the hierarchical structure of information recorded on the optical disc shown in FIG. 1.

FIG. 30 is a view for explaining another example of the hierarchical structure of information recorded on the optical disc shown in FIG. 1.

The recorded contents of data area DA correspond to those shown in FIG. 4 that has already been explained.

More specifically, the recorded contents of audio/video data area DA2 in FIG. 30 correspond to those of audio/video data area DA2 shown in FIG. 4 as follows:

navigation data (RTR_VMG) DA21a in FIG. 30 . . . control information DA21 in FIG. 4;

movie video object (RTR_MOV.VOB) DA22a in FIG. 30 . . . video object DA22 in FIG. 4;

still picture video object (RTR_STO.VOB) DA23a in FIG. 30 . . . picture object DA23 in FIG. 4;

additional audio object (RTR_STA.VOB) DA24a for still pictures in FIG. 30 . . . audio object DA24 in FIG. 4;

manufacturer specification object (MSP.VOB) DA25a in FIG. 30 . . . not shown in FIG. 4; and another stream object (AST.SOB) DA26a in FIG. 30 . . . not shown in FIG. 4.

Note that RTR is an abbreviation for real-time recording.

Navigation data (RTR_VMG) DA21a is used upon controlling recording, playback, and editing of an AV stream (one or more video objects VOBs). This RTR_VMG has all required navigation data as well as a single management information file called RTR.IFO.

More specifically, navigation data (RTR_VMG) DA21a includes RTR video management information (RTR_VMGI) DA210a, movie AV file information table (M_AVFIT) DA210b, still picture AV file information table (S_AVFIT) DA210c, original PGC information (ORG_PGCI) DA210d, user-defined PGC information table (UD_PGCI) DA210e, text data manager (TXTDT_MG) DA210f, and manufacturer information table (MN_FIT) DA210g.

Those pieces of information (DA210a to DA210g) are successively recorded in file RTR.IFO in the aforementioned order.

Most of information described in this file RTR.IFO is stored in a system memory (work RAM in MPU 30 in FIG. 27).

RTR_VMGI/DA210a describes basic information (information similar to video manager information VMGI in a DVD video ROM) of an RTR disc (disc 10 in FIG. 1).

Figure 35:
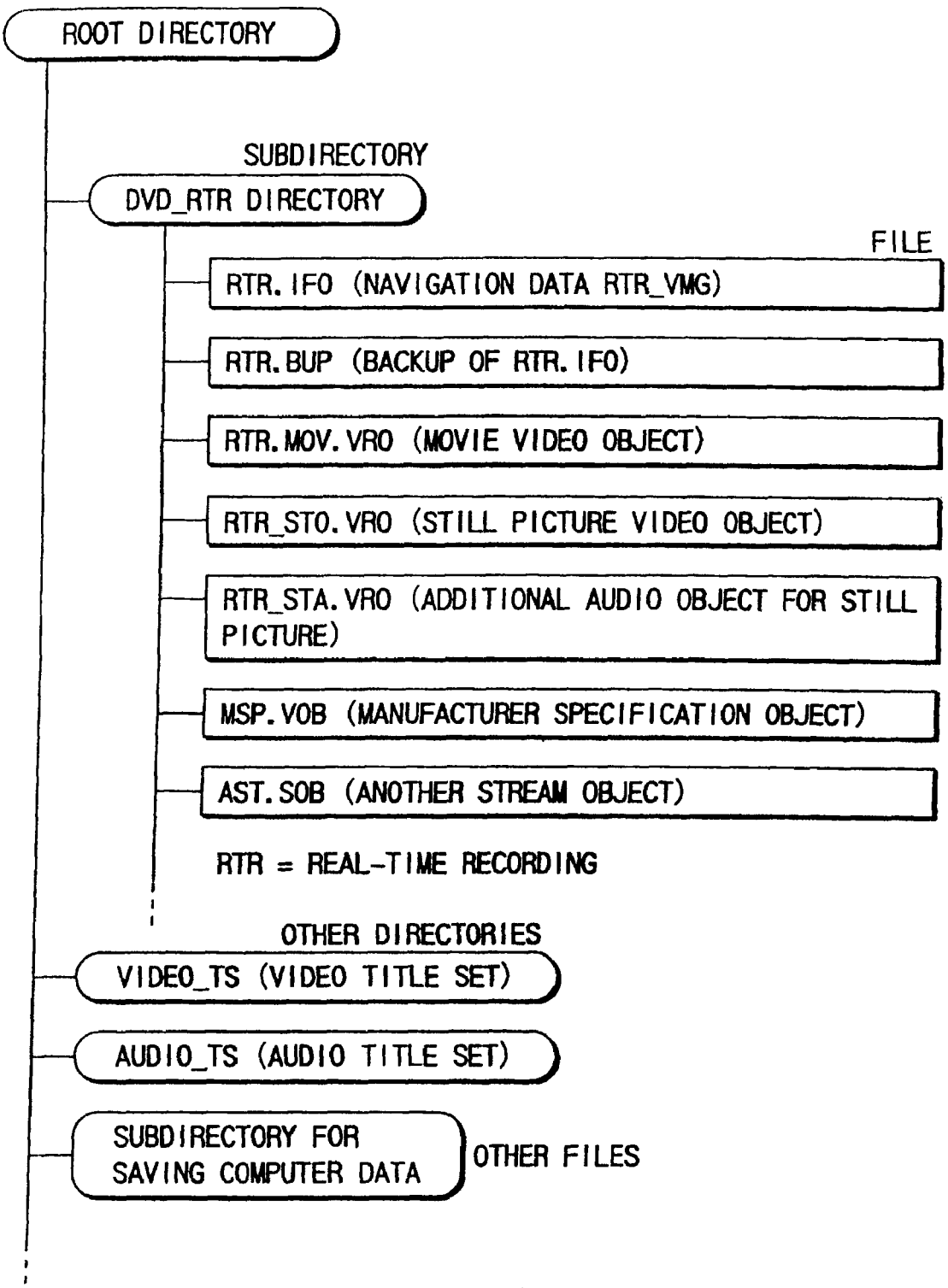
FIG. 35 is a view for explaining an example of the directory structure of information (data files) recorded on the optical disc shown in FIG. 1 to have the structure shown in FIG. 30.

M_AVFIT_SA/DA210b describes a movie AV file corresponding to RTR_MOV.VRO in FIG. 35 (VRO is an abbreviation for a video recorder object).

In correspondence with AV data control information DA210 in control information DA21 in FIG. 4, navigation data DA21a in FIG. 30 includes movie AV file information table (M_AVFIT) DA210b.

This movie AV file information table (M_AVFIT) DA210b includes movie AV file information table information (M_AVFITI) DA2100, one or more pieces of movie VOB stream information (M_VOB_STI#1 to M_VOB_STI#n) DA2102-1 to DA2102-n, and movie AV file information (M_AVFI) DA2104.

M_AVFI/DA2104 describes information of a movie AV file having a file name "RTR_MOV.VRO".

This movie AV file information (M_AVFI) DA2104 includes movie AV file information general information (M_AVFI_GI) DA21040, one or more movie VOB information search pointer #1 to #n (M_VOBI_SRP#1 to M_VOBI_SRP#n) DA21042-1 to DA21042-n, and one or more pieces of movie VOB information #1 to #n (M_VOBI#1 to M_VOBI#n) DA21044-1 to DA21044-n.

n pieces of M_VOBI in M_AVFI/DA2104 are described in the same order as that of VOB data stored in the movie AV file.

Each movie VOB information (e.g., M_VOBI#n/DA21044-n) includes movie VOB general information M_VOBI_GI and time map information TMAPI.

Figure 31:
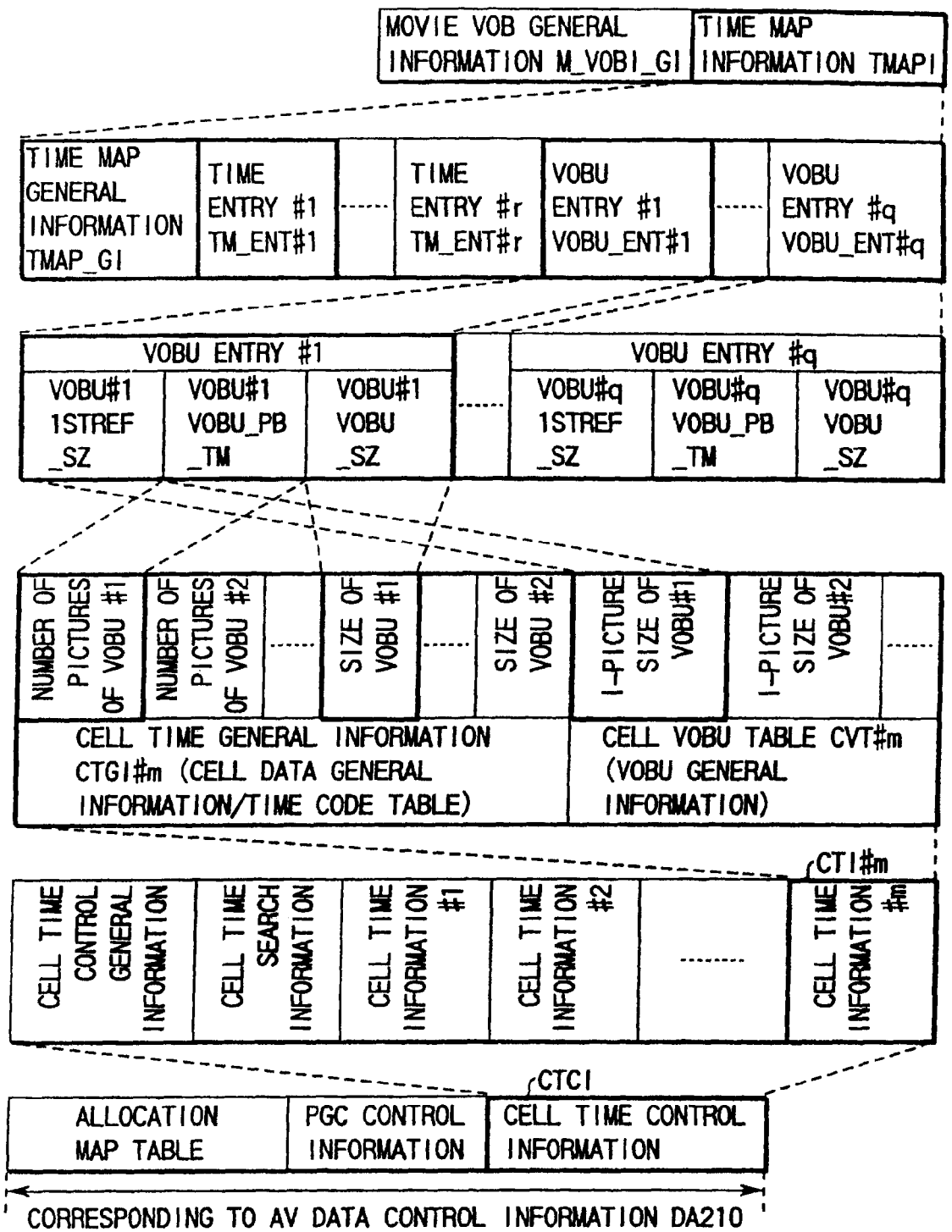
FIG. 31 is a view that exemplifies the contents (especially VOBU entry VOBU_ENT#) of time map information TMAPI shown in FIG. 30, and also exemplifies the correspondence between the contents and AV data control information DA210 shown in FIG. 4.

FIG. 31 exemplifies the contents of time map information TMAPI in FIG. 30, and also the correspondence between these contents and AV data control information DA210 in FIG. 4.

Time map information TMAPI is used upon executing special playback (e.g., cell playback in the order unique to each user using user defined PGC) and time search.

Time map information TMAPI includes time map general information TMAP_GI, one or more time entries TM_ENT#1 to TM_ENT#r, and one or more VOBU entries VOBU_ENT#1 to VOBU_ENT#q.

Each VOBU entry contains information of the size and playback time of each VOBU. The VOBU size is presented in units of sectors (2 kbytes), and the playback time is presented in units of video fields (one field=⅟₆₀ sec in NTSC; one field=⅟₅₀ sec in PAL).

Since the VOBU size is presented in units of sectors, as described above, VOBUs can be accessed using addresses in units of sectors.

On the other hand, each time entry contains address information of the corresponding VOBU, and time difference information. This time difference information indicates the difference between the playback time designated by the time entry and the VOBU playback start time.

Assuming that the time interval (time unit TMU) between two successive time entries is 10 sec, this time entry interval corresponds to 600 fields in, e.g., NTSC video.

Each VOBU entry, e.g., VOBU entry #1, includes reference picture size information 1STREF_SZ, VOBU playback time information VOBU_PB_TM, and VOBU size information VOBU_SZ.

Note that reference picture size information 1STREF_SZ represents the size of the first reference picture (corresponding to I-picture in MPEG) of the VOBU of interest in units of sectors.

The VOBU general information included in cell VOBU table #m in FIG. 8 includes I-picture end position information, as shown in FIG. 9. The presence of the I-picture end position information means the presence of the size information from the start position (address) of the VOBU of interest to that I-picture end position. Therefore, 1STREF_SZ (corresponding to the I-picture size of VOBU#1) in FIG. 31 corresponds to the VOBU general information included in the cell VOBU table in FIG. 8.

VOBU playback time information VOBU_PB_TM in FIG. 31 represents the playback time of the VOBU of interest in units of video fields.

The time code table included in cell time general information in FIG. 8 contains information of the number of pictures and the number of sectors in a VOBU. Since the playback time of each VOBU changes depending on the number of pictures and the number of sectors included there, the time code table included in cell time general information #m in FIG. 8 includes information corresponding to VOBU playback time information VOBU_PB_TM in FIG. 31.

VOBU size information VOBU_SZ in FIG. 31 represents the size of the VOBU of interest in units of sectors. Since one ECC block corresponds to 16 sectors, this VOBU size information VOBU_SZ corresponds to information of the number of ECC blocks in a VOBU included in the time code table shown in FIG. 8.

VOBU playback time information VOBU_PB_TM in FIG. 31 represents the playback time of each VOBU of interest in units of video fields. In general, since one frame=one picture=two fields, information VOBU_PB_TM in FIG. 31 indicates the same information contents as the number of VOBU pictures in FIG. 8.

In summary, cell time information CTI shown in FIG. 8 (and FIG. 4) includes VOBU general information corresponding to 1STREF_SZ in the VOBU entry in FIG. 31, and cell time general information (the number of VOBU pictures and the number of ECC blocks in a VOBU) corresponding to VOBU_PB_TM and VOBU_SZ in FIG. 31.

Therefore, cell time information CTI #m shown in FIG. 8 (and FIG. 4) conceptually has contents corresponding to the VOBU entry in FIG. 31.

Cell time information CTI #1 in FIG. 31 is included in cell time control information CTCI, which is included in AV data control information DA210 in FIG. 4.

That is, navigation data (RTR_VMG) in FIG. 30 corresponds to control information DA21 in FIG. 4 in a broad sense.

Normally, the "time interval between neighboring VOBUs" is expressed by the number of fields in the VOBU entry. As another method, a "count value from a given VOBU to the next VOBU by a clock counter" may be used to express the "time interval between neighboring VOBUs".

For example, the "time interval between neighboring VOBUs" can be expressed by the "difference value between the value of presentation time stamp PTS (see FIG. 6) at the start position of one VOBU and the value of PTS at the start position of the immediately succeeding VOBU".

In other words, "the time interval in a specific unit can be expressed by the difference value of the clock counter in that unit". Such unit can also be called a streamer object unit (SOBU).

In addition, the following remarks will be given in association with the contents of the time code table shown in FIG. 8.

In FIG. 8, the time code table is expressed by the number of VOBU pictures, and the number of ECC blocks in a VOBU. As another embodiment of the present invention, the following method may be used. That is, the number of fields (one picture=two fields) included in a VOBU may be used in place of the number of VOBU pictures. Furthermore, the number of sectors (one ECC block=16 sectors) in an area where the VOBU of interest is recorded can be used in place of the number of ECC blocks in a VOBU.

FIG. 32 exemplifies the contents of time map general information TMAP_GI shown in FIG. 31.

This time map general information TMAP_GI includes TM_ENT_Ns indicating the number of time entries in that time map information, VOBU_ENTNs indicating the number of VOBU entries in that time map information, time offset TM_OSF for that time map information, and address offset ADR_OFS of that time map information.

When a value (10 seconds or equivalent) corresponding to 600 fields in NTSC video (or 500 fields in PAL video) is used as time unit TMU, time offset TM_OSF is used to represent the time offset within TMU.

When the VOBU size is expressed by the number of sectors, address offset ADR_OFS is used to indicate the total size of preceding VOBs (one or more preceding VOBs) in an AV file.

FIG. 33 exemplifies the contents of time entry TM_ENT shown in FIG. 31.

This time entry TM_ENT includes VOBU_ENTN indicating the number of the corresponding VOBU entry, TM_DIFF indicating the time difference between the playback time of a VOBU designated by the time entry, and the computed playback time, and VOBU_ADR indicating the target VOBU address.

When time unit TMU is expressed by 600 fields in NTSC (or when time unit TMU is expressed by 500 fields in PAL), the "computed playback time" with respect to time entry #j is given by TMU×(j−1)+TM_OSF.

On the other hand, VOBU_ADR indicates the target VOBU address by the total size of VOBUs preceding the VOBU of interest when the VOBU size is expressed in units of sectors.

Figure 34:
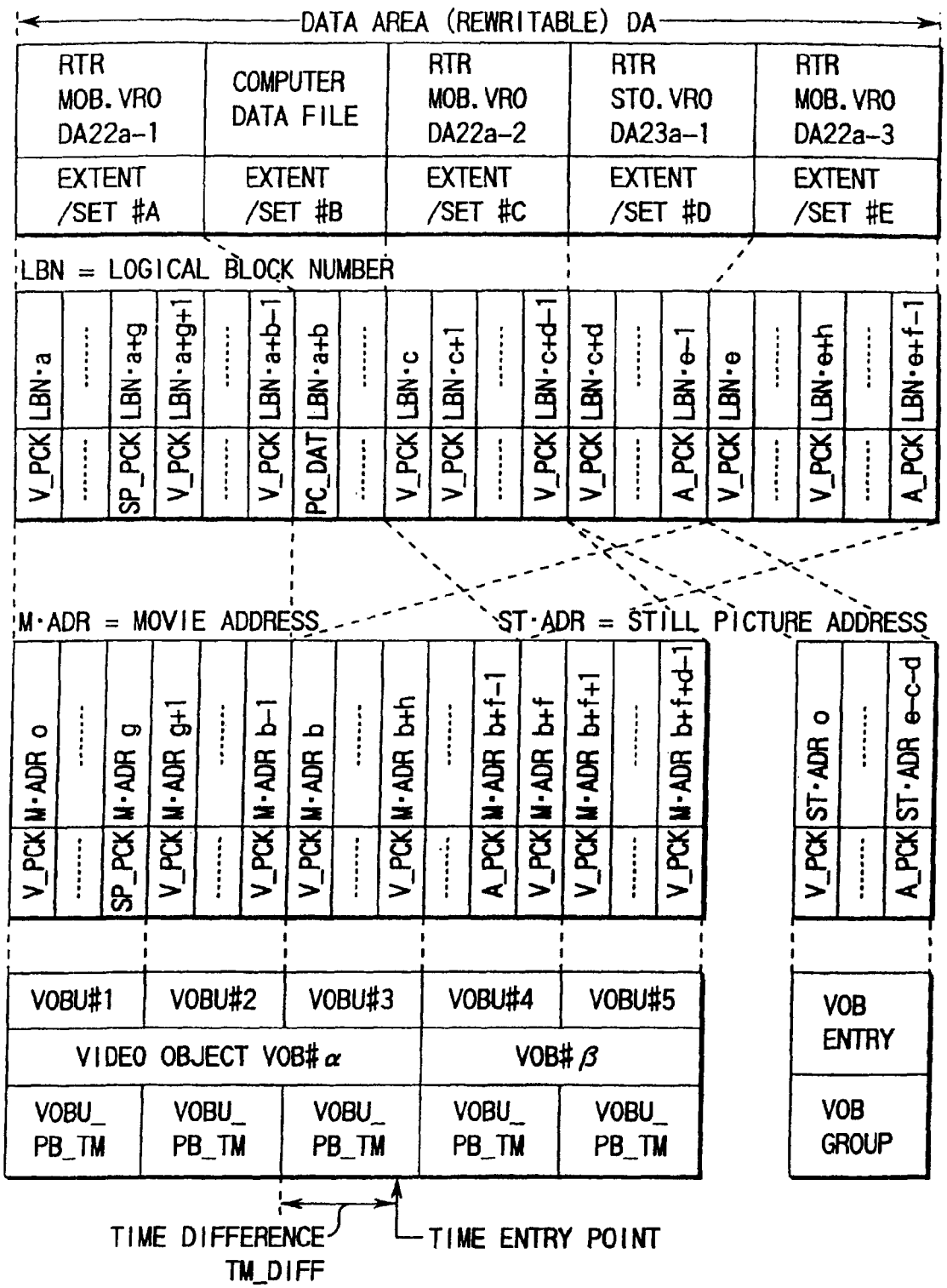
FIG. 34 is a view for explaining the recorded contents of data area DA in FIG. 30, and a time entry point (access point) upon playing back a specific portion (e.g., VOBU#3) of the recorded contents.

FIG. 34 is a view for explaining the recorded contents of data area DA in FIG. 30, and a time entry point (access point) upon playing back a specific portion (e.g., VOBU#3) of the recorded contents.

As has been described above with reference to FIG. 30, data area DA records movie video object RTR_MOB.VOB (DA22a-1 to DA22a-3), still picture video object RTR_STO.VOB (DA23a-1), a computer data file, and the like.

For example, in one movie video object RTR_MOB.VOB (DA22a-1), its data extent/set #A stores data (video pack V_PCK, sub-picture pack SP_PCK, and the like) from logical block numbers LBN·a to LBN·a+b−1.

These logical block numbers correspond to predetermined movie addresses (M·ADR o to M·ADR b−1). A given portion of a set of these movie addresses corresponds to VOBU#1, and the remaining portion corresponds to VOBU#2.

Likewise, a set of movie addresses corresponding to a portion of a computer data file (extent #B) in data area DA corresponds to VOBU#3. On the other hand, a set of movie addresses corresponding to the remaining portion of the computer data file (extent #B) and movie addresses (M·ADRb+f) of a portion of another extent #C corresponds to VOBU#4, and a set of movie addresses of the remaining portion of extent #C corresponds to VOBU#5.

In the aforementioned set of VOBUs, VOBU#1 to VOBU#3 make up video object VOB #α, and VOBU#4 to VOBU#5 make up video object VOB#β.

In the data structure exemplified above, in order to start playback from the middle of, e.g., VOBU#3, that access point must be determined. This access point is assumed to be a time entry point.

In the example shown in FIG. 34, the time entry point is located at a position separated the time difference indicated by time difference information TM_DIFF in time entry TM_ENT in FIG. 33 from a position indicated by movie address information (MADR b) of VOBU#3. This time entry point serves as a special playback start point (or time search point) indicated by time map information TMAPI.

FIG. 35 is a view for explaining an example of the directory structure of information (data files) recorded on the optical disc shown in FIG. 1 in the structure shown in FIG. 30.

Even when the data structure shown in FIG. 30 is used on the disc/apparatus side, this data structure is invisible to the user. The data structure that the user can actually see is a hierarchical file structure shown in FIG. 35.

More specifically, directories such as a DVD_RTR directory, VIDEO_TS directory, AUDIO_TS directory, computer data file directories, and the like are displayed on the display screen (not shown) of the root directory by means of menu windows, icons, or the like in correspondence with the types of data recorded on data area DA shown in FIG. 30.

The DVD_RTR directory shown in FIG. 35 stores file RTR.IFO of navigation data RTR_VMG in FIG. 30, backup file RTR.BUP of RTR.IFO, file RTR_MOV.VRO of movie video object RTR_MOV.VOB, file RTR_STO.VRO of still picture video object RTR_STO.VOB, file RTR_STA.VRO of additional audio object RTR_STA.VOB for still pictures, manufacturer specification object file MSP.VOB, another stream object file AST.SOB, and the like.

When the DVD video recorder shown in FIG. 27 (RTR video recorder capable of real-time recording) has a directory display function shown in FIG. 35, and a DVD video ROM disc is set in its disc drive 32, the VIDEO_TS directory in FIG. 35 is activated. In this case, when the user opens the VIDEO_TS directory, the recorded contents of the set disc are further displayed.

When the apparatus shown in FIG. 27 has a DVD audio playback function, and a DVD audio disc is set in its disc drive 32, the AUDIO_TS directory in FIG. 35 is activated. In this case, when the user opens the AUDIO_TS directory, the recorded contents of the set desk are further displayed.

Likewise, when the apparatus shown in FIG. 27 has a computer data processing function, and a DVD-RAM (or DVD-ROM) disc that recorded computer data is set in its disc drive 32, the computer data directory in FIG. 35 is activated. In this case, when the user opens the computer data directory, the recorded contents of the set desk are further displayed.

The user can access the recorded sources of DVD video, DVD video ROM, DVD audio, and computer data (including programs) as if he or she were operating a personal computer, while observing a menu screen or window display screen displayed with the directory structure shown in FIG. 35.

Figure 36:
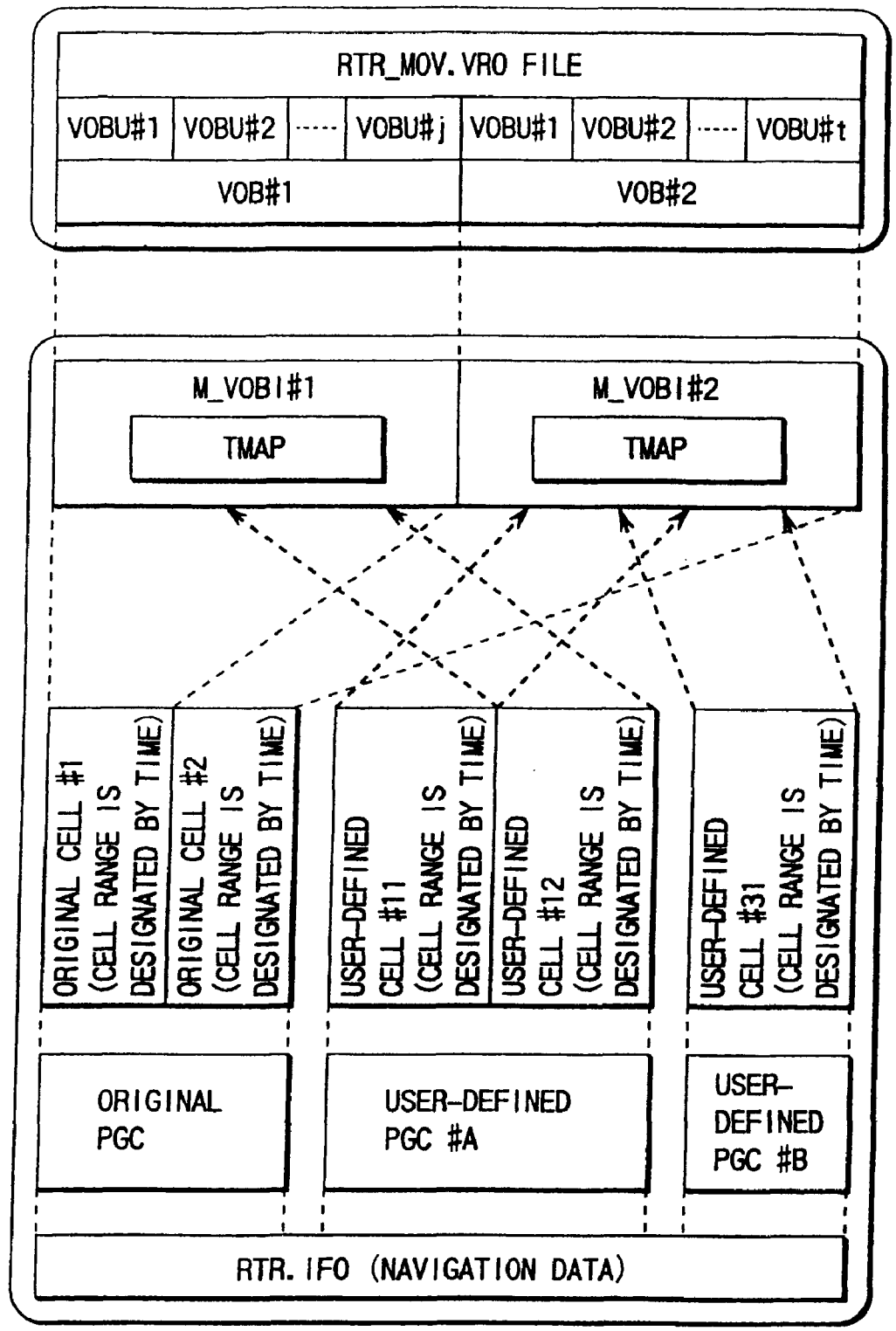
FIG. 36 is a schematic view for explaining a case wherein the cell playback order of the initially recorded contents (original PGC) has been changed by the user later using a user-defined PGC.

FIG. 36 is a schematic view for explaining a case wherein the cell playback order of the initially recorded contents (original PGC) has been changed by the user later using a user-defined PGC.

For example, video data (video object set VOBS) recorded on audio/video data area DA2 in FIG. 5 is comprised of a set of one or more program chains PGC. Each PGC is a set of programs as sets of one or more cells, and the playback order of cells that form each program can be determined by original PGC information (ORG_PGCI·DA210d in FIG. 30) or a user-defined PGC information table (UD_PGCI·DA210e in FIG. 30).

The playback time and order of cells designated by the original PGC information or user-defined PGC information are converted into the addresses of VOBUs that form each of cells to be played back via a table (TMAP) in time map information TMAPI in FIG. 30.

More specifically, when playback is made based on an original PGC (the cell playback order in the initially recorded state), the VOBU addresses in the time band to be played back are obtained via time map information table TMAP in accordance with the contents of ORG_PGCI in FIG. 30, and playback is made in that order.

On the other hand, when playback is made based on a PGC uniquely defined by the user (e.g., when the user has edited the playback order after video recording), the VOBU addresses in the time band to be played back are obtained via time map information table TMAP in accordance with the contents of UD_PGCI in FIG. 30, and playback is made in that order.

The cell playback order based on user-defined PGC information UD_PGCI can be quite different from that based on original PGC information ORG_PGCI.

Note that the playback time and the addresses of VOBUs to be played back can correspond to each other by looking up the contents of the time entries and VOBU entries in time map information TMAPI shown in FIG. 31.

The I-picture audio position information in FIG. 9 expresses, using sectors as a unit, the differential address value from the start position of a VOBU of a sector that includes an audio pack of the same time as the I-picture start time. However, the present invention is not limited to such sector unit, and the differential address may be expressed using the number of differential ECC blocks or the number of VOBUs that indicates a "shift" amount, depending on different embodiments of the present invention.

Figure 37:
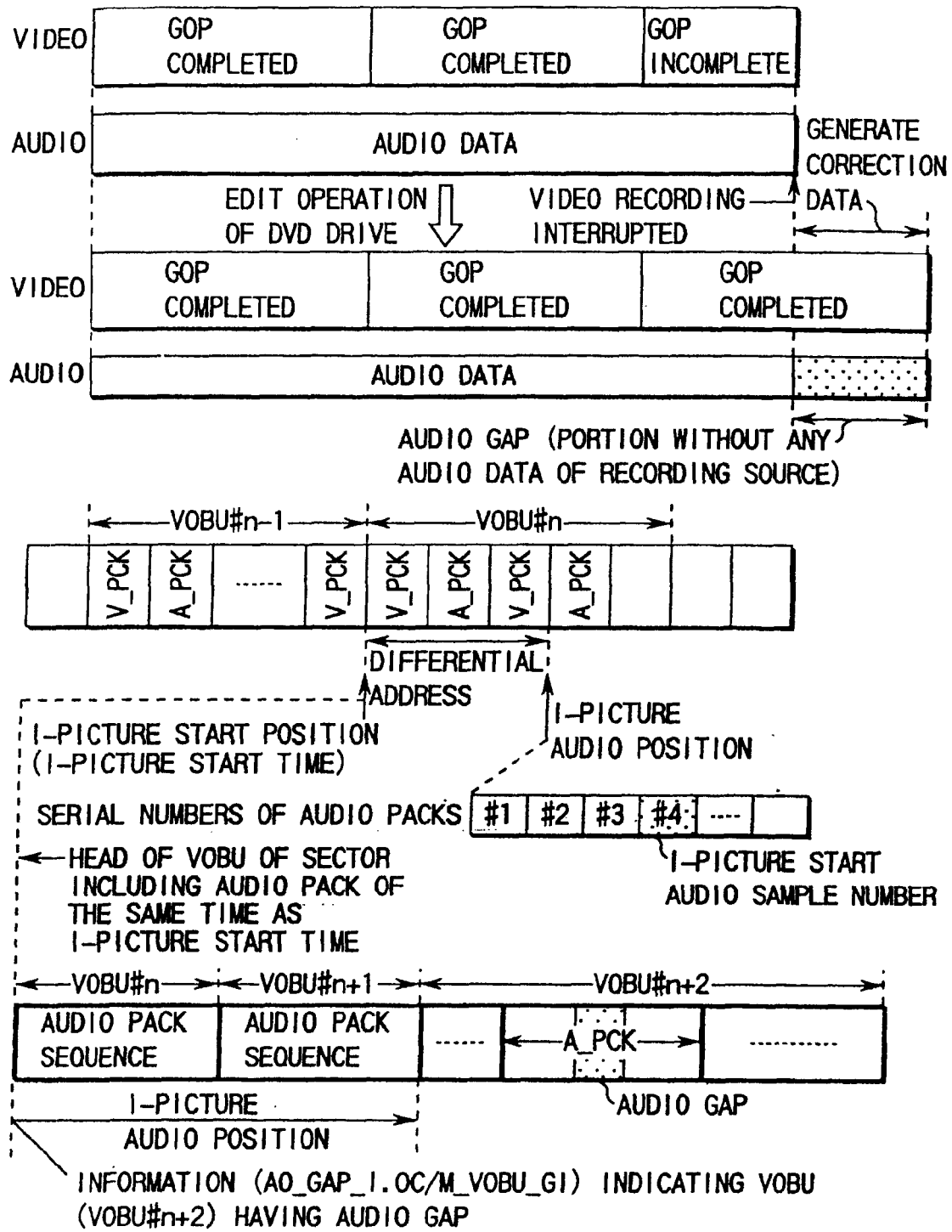
FIG. 37 is a view for explaining problems that will occur in audio data when video recording is interrupted before a GOP of MPEG-encoded video data comes to an end upon recording corresponding audio data together with MPEG-encoded video data.

That is, the "shift" amount of a VOBU that includes an audio pack of the same time as the I-picture start time from a VOBU that includes the I-picture of interest can be expressed using the number of VOBUs. FIG. 37 shows this example.

FIG. 37 is a view for explaining problems that will occur in audio data when video recording is interrupted before a GOP of MPEG-encoded video data comes to an end upon recording corresponding audio data together with MPEG-encoded video data.

In a DVD video recorder that makes video recording while executing MPEG encoding, the user (or video recording timer) sometimes interrupts video recording before a GOP (from a given I-picture to a position immediately before the next I-picture) comes to an end. In such case, audio data recorded parallel to video data is interrupted at the same time.

Upon playing back MPEG-encoded video recorded contents, since an incomplete GOP portion cannot be decoded, a process for completing that GOP by appending correction data to the incomplete GOP is done upon encoding.

In this case, since there is no audio data for a portion (less than 0.5 sec if the playback time per GOP is 0.5 sec) corresponding to the playback time of the correction data appended to complete the GOP, sound is interrupted (abnormal sound is produced in some cases) upon video playback of that portion. Assume that this portion is called an audio gap.

In order to cope with sound interrupt (or abnormal sound) due to such audio gap upon playback, the position of this audio gap must be detected.

The time at which the audio gap is displayed matches the time at which the last data of VOBU#n−1 is displayed with respect to video data. Therefore, the last display time of the audio gap period (=the time at which the next audio information is displayed, i.e., the time at which sound restarts) matches the time at which the first I-picture in VOBU#n as the next VOBU is displayed. Therefore, the I-picture audio position in FIG. 9 is information indicating the position of a VOBU which includes an audio pack as the audio gap end time of the same time as the I-picture start time.

More specifically, the position of specific information such as the audio gap can be detected by exploiting the contents of the audio synchronization information shown in FIG. 9.

That is, the start position (I-picture start time) of the "GOP completed by correction" can be specified using "I-picture audio position" information in the audio synchronization information in FIG. 9.

The presence of specific information such as the audio gap behind the I-picture in the GOP can be detected based on the most significant bit="0" of 1-byte "I-picture audio position information".

Also, the audio sample position that corresponds to the specific information like the audio gap from the I-picture start time of the GOP can be specified by the "I-picture start audio sample number" in the audio synchronization information in FIG. 9.

Use of the "I-picture start audio sample number" in FIG. 9 is not limited to position detection of the audio gap, but FIG. 37 exemplifies that the audio synchronization information shown in FIG. 9 can be exploited in "audio gap position detection".

According to the embodiment of the present invention, the following effects are obtained.

(1) When the time map information (TMAPI in FIG. 31) is available, even when the user has changed the playback order using user-defined PGC information to be different from an original one, the VOBU from which playback is to start can be detected using the VOBU entries in time map information TMAPI. By rewriting the user-defined PGC information without re-recording data while changing the initial recording order, video playback can be made in an arbitrary order.

(2) Since the cell configuration of a program chain to be recorded can be corrected as needed in correspondence with the performance of a disc drive used, seamless, continuous playback or recording can be implemented irrespective of the disc drive used.

(3) Since the audio synchronization information is provided, even when postrecording is done from various sound sources (digital sound sources generated at various sample rates) using dummy packs and the like (i.e., even when the sample rate of an original sound source recorded in audio packs is different from that of another sound source recorded in dummy packs by postrecording), synchronization (playback timing) between a video signal recorded in video packs and the postrecorded audio signal can be prevented from shifting.

(4) Since the audio synchronization information is provided, even when multi-channel recording is done using various sound sources (digital sound sources generated at various sample rates), synchronization (playback timing) of audio signals among channels can be prevented from shifting.

(5) Even when the contents of a specific area in video information are re-arranged on the information storage medium by, e.g., an edit process, continuous audio signal playback can be made without any sound interrupt or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A machine readable information storage medium for access by an information playback system, the information storage medium embodied as an optical disc comprising:

a first area in which a video object is recorded; and a second area in which control information is recorded, the control information including first program chain information and second program chain information, the first program chain information relating to a first program chain, the second program chain information relating to a second program chain, cells being specified by the control information, the first program chain specifying a first playback sequence of one part of the cells, the second program chain specifying a second playback sequence of another part of the cells, a first cell of the one part of cells referring to a first region of the video object, a second cell of the another part of cells referring to a second region of the video object, a part of the first region being able to overlap with the second region to enable playback of the part of the first region, another part of the first region being able not to include the second region, one of the cells corresponding to a specific ID, the specific ID relating to Main video or Sub video, the first program chain information including information which relates to a total number of the one part of cells, the control information including I-picture end position information, and the control information including information which indicates an audio signal coding type,
wherein the control information is read and provided to play back the video object by the information playback system, and
the video object is accessed according to the read control information.

2. An information playback method for information playback from an information storage medium embodied as an optical disc including,
a first area in which a video object is recorded, and
a second area in which control information is recorded,
the control information including first program chain information and second program chain information,
the first program chain information relating to a first program chain,
the second program chain information relating to a second program chain,
cells being specified by the control information,
the first program chain specifying a first playback sequence of one part of the cells,
the second program chain specifying a second playback sequence of another part of the cells,
a first cell of the one part of cells referring to a first region of the video object,
a second cell of the another part of cells referring to a second region of the video object,
a part of the first region being able to overlap with the second region to enable playback of the part of the first region,
another part of the first region being able not to include the second region,
one of the cells corresponding to a specific ID,
the specific ID relating to Main video or Sub video,
the first program chain information including information which relates to a total number of the one part of cells,
the control information including I-picture end position information, and
the control information including information which indicates an audio signal coding type,
the information playback method comprising:
reading the control information; and
accessing and playing back the video object based on the read control information.

3. An information recording method for recording information on an information storage medium embodied as an optical disc including,
a first area in which a video object is recorded, and
a second area in which control information is recorded,
the control information including first program chain information and second program chain information,
the first program chain information relating to a first program chain,
the second program chain information relating to a second program chain,
cells being specified by the control information,
the first program chain specifying a first playback sequence of one part of the cells,
the second program chain specifying a second playback sequence of another part of the cells,
a first cell of the one part of cells referring to a first region of the video object,
a second cell of the another part of cells referring to a second region of the video object,
a part of the first region being able to overlap with the second region to enable playback of the part of the first region,
another part of the first region being able not to include the second region,
one of the cells corresponding to a specific ID,
the specific ID relating to Main video or Sub video,
the first program chain information including information which relates to a total number of the one part of cells,
the control information including I-picture end position information, and
the control information including information which indicates an audio signal coding type,
the information recording method comprising:
recording a new video object on the first area; and
adding new control information to the second area.

4. An information playback system for information playback from an information storage medium according to claim 1, the information playback system comprising:
a reading unit configured to read the control information; and
an accessing unit configured to access and to play back the video object based on the read control information.

* * * * *